United States Patent
Kurita et al.

(10) Patent No.: US 10,211,918 B2
(45) Date of Patent: Feb. 19, 2019

(54) DEVICE, SYSTEM, AND METHOD FOR DISPLAYING AN IMAGE TOGETHER WITH A SUPERIMPOSED LIGHT COMPONENT REPRESENTING A CODE

(71) Applicant: Sony Corporation, Tokyo (JP)

(72) Inventors: Teppei Kurita, Kanagawa (JP); Kensei Jo, Kumamoto (JP); Tomoo Mitsunaga, Kanagawa (JP); Kei Nakagawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/543,960

(22) PCT Filed: Jan. 12, 2016

(86) PCT No.: PCT/JP2016/000100
§ 371 (c)(1),
(2) Date: Jul. 14, 2017

(87) PCT Pub. No.: WO2016/117293
PCT Pub. Date: Jul. 28, 2016

(65) Prior Publication Data
US 2018/0006725 A1    Jan. 4, 2018

(30) Foreign Application Priority Data
Jan. 23, 2015    (JP) ................. 2015-011591

(51) Int. Cl.
*H04B 10/114*    (2013.01)
*H04B 10/54*    (2013.01)
*H04B 10/116*    (2013.01)

(52) U.S. Cl.
CPC ....... *H04B 10/1141* (2013.01); *H04B 10/116* (2013.01); *H04B 10/541* (2013.01)

(58) Field of Classification Search
CPC .. H04B 10/1141; H04B 10/541; H04B 10/116
See application file for complete search history.

(56) References Cited

U.S. PATENT DOCUMENTS

2014/0204129 A1    7/2014 Oshima et al.

FOREIGN PATENT DOCUMENTS

| JP | 2007-074268 A | 3/2007 |
| KR | 10-2014-0061235 A | 5/2014 |
| WO | WO 2013/175803 A1 | 11/2013 |

OTHER PUBLICATIONS

Wang et al., "Demo: A Robust Barcode System for Data Transmissions over Screen-Camera Links", Mobile Computing and Networking, ACM, Sep. 7, 2014, pp. 321-324.

(Continued)

*Primary Examiner* — Leslie C Pascal
(74) *Attorney, Agent, or Firm* — Wolf, Greenfield & Sacks, P.C.

(57) ABSTRACT

One information processing device may comprise circuitry configured to cause an image to be displayed on a display together with a superimposed light component having a characteristic that changes as a function of time and represents a code to be processed by a receiving terminal. Another information processing device may comprise circuitry configured to process image data from an image sensor, which image data represents an image generated on a display together with a superimposed light component having a characteristic that changes as a function of time, to identify a code represented by the superimposed light component.

23 Claims, 16 Drawing Sheets

(56) References Cited

OTHER PUBLICATIONS

Communication pursuant to Article 94(3) dated Aug. 15, 2018 in connection with European Application No. 16706263.7.

[Fig. 1]
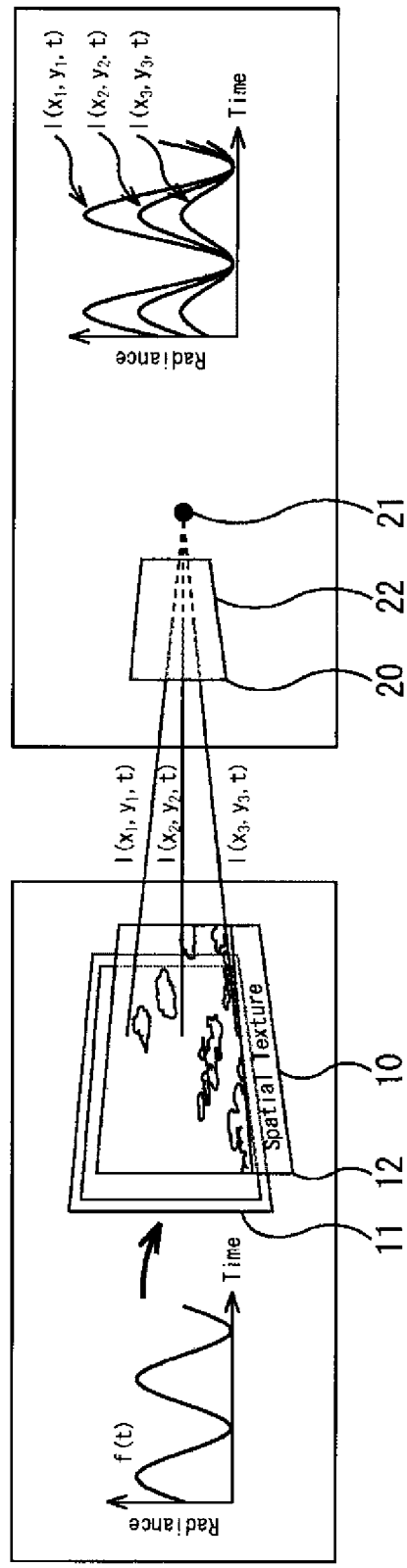

[Fig. 2]
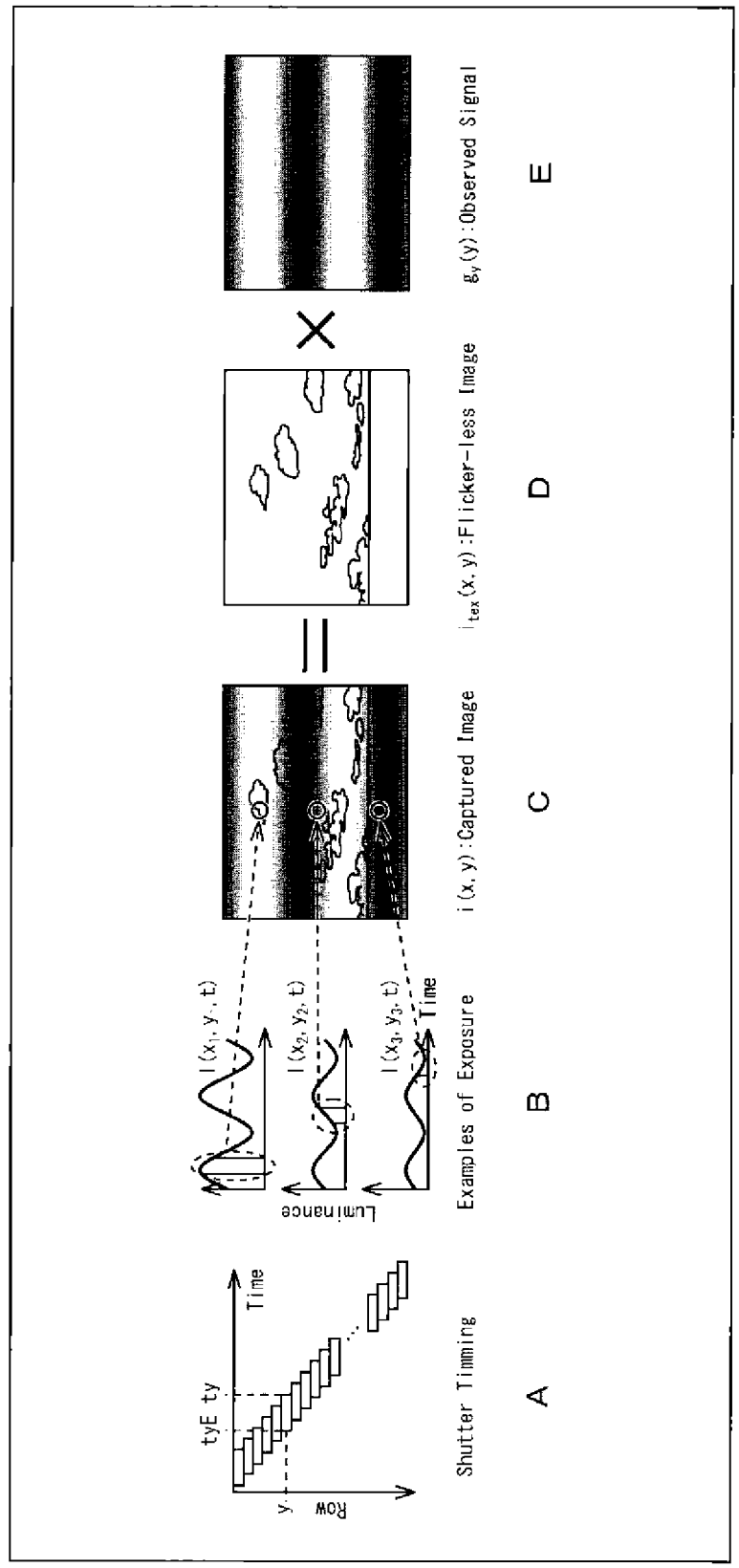

[Fig. 3]
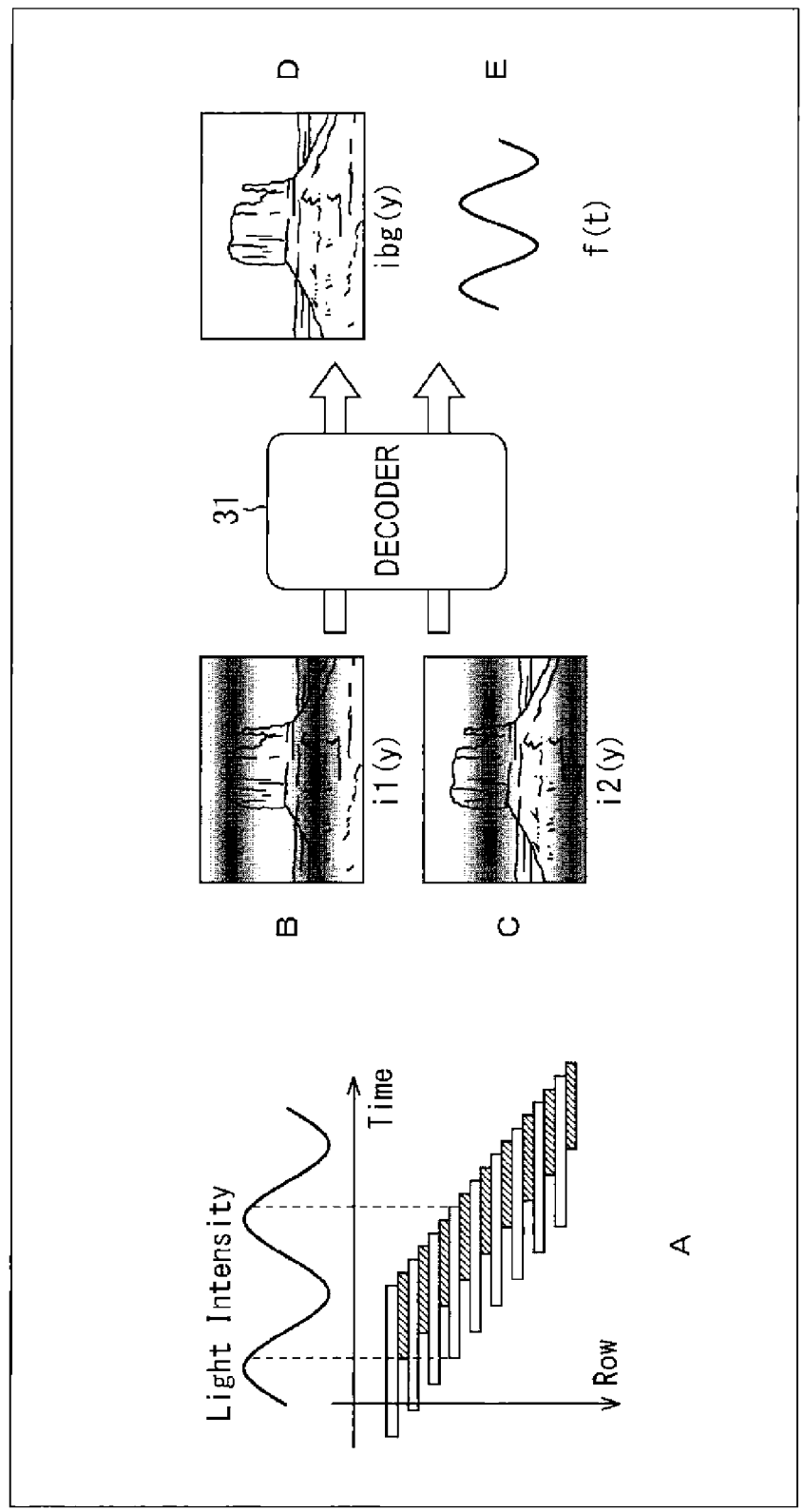

[Fig. 4]
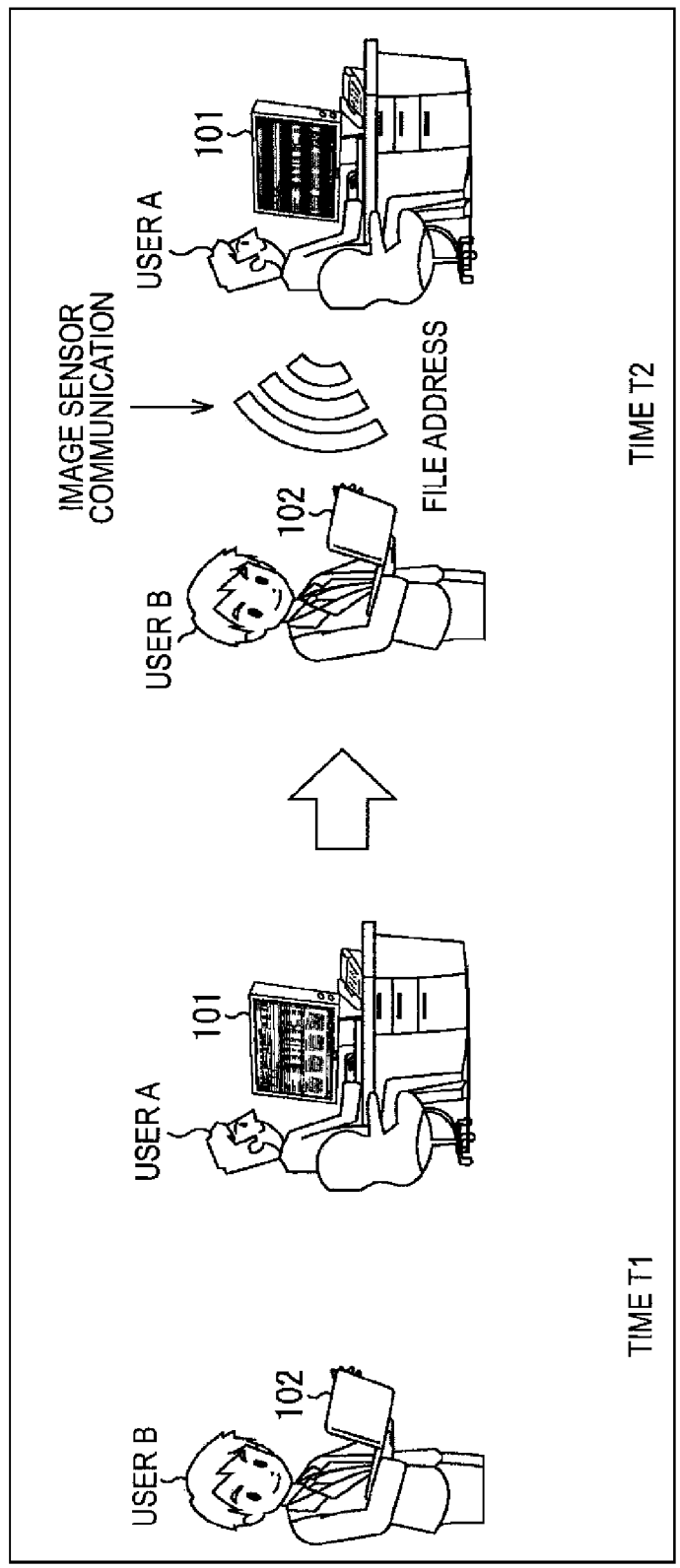

[Fig. 5]
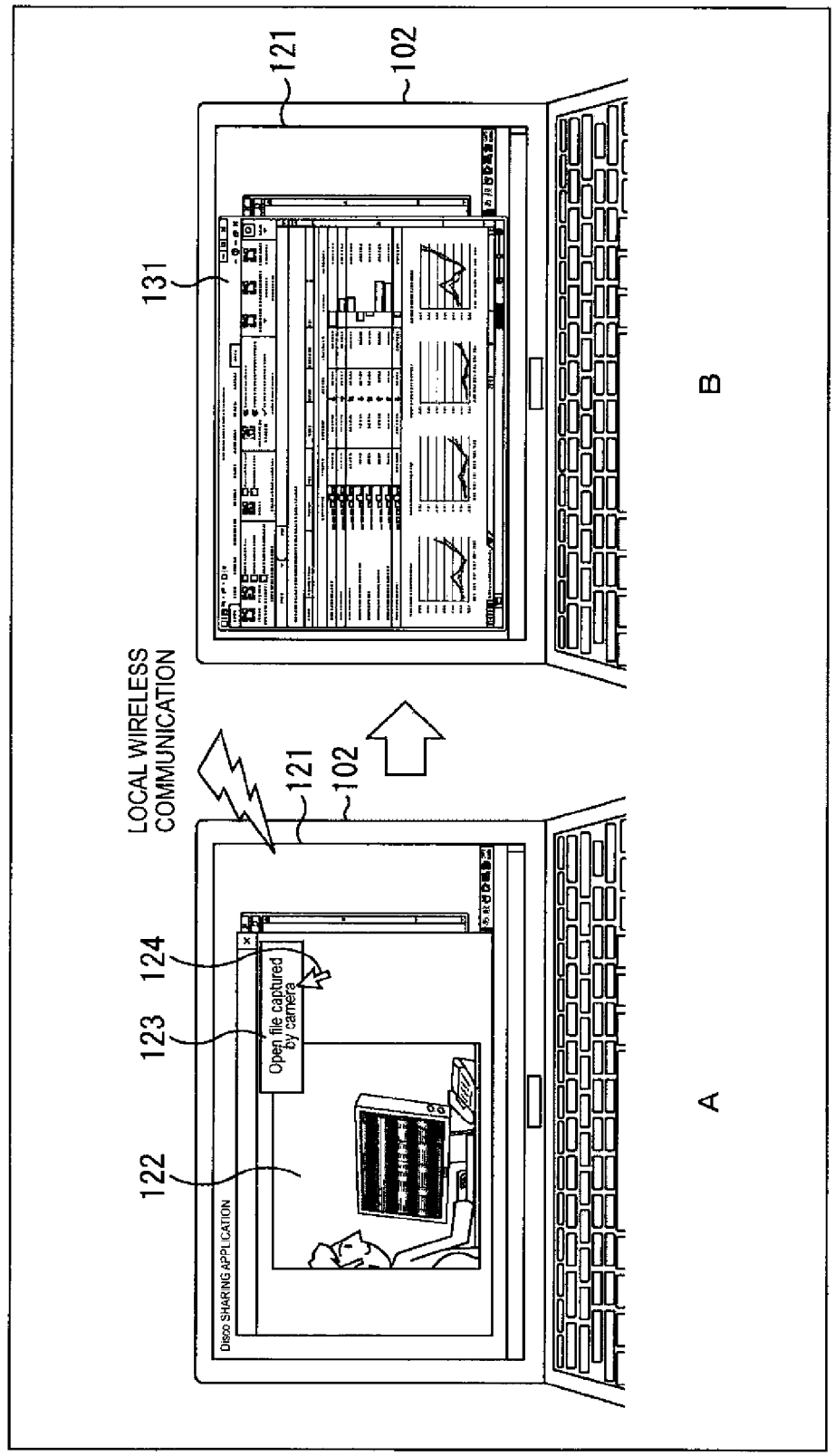

[Fig. 6]
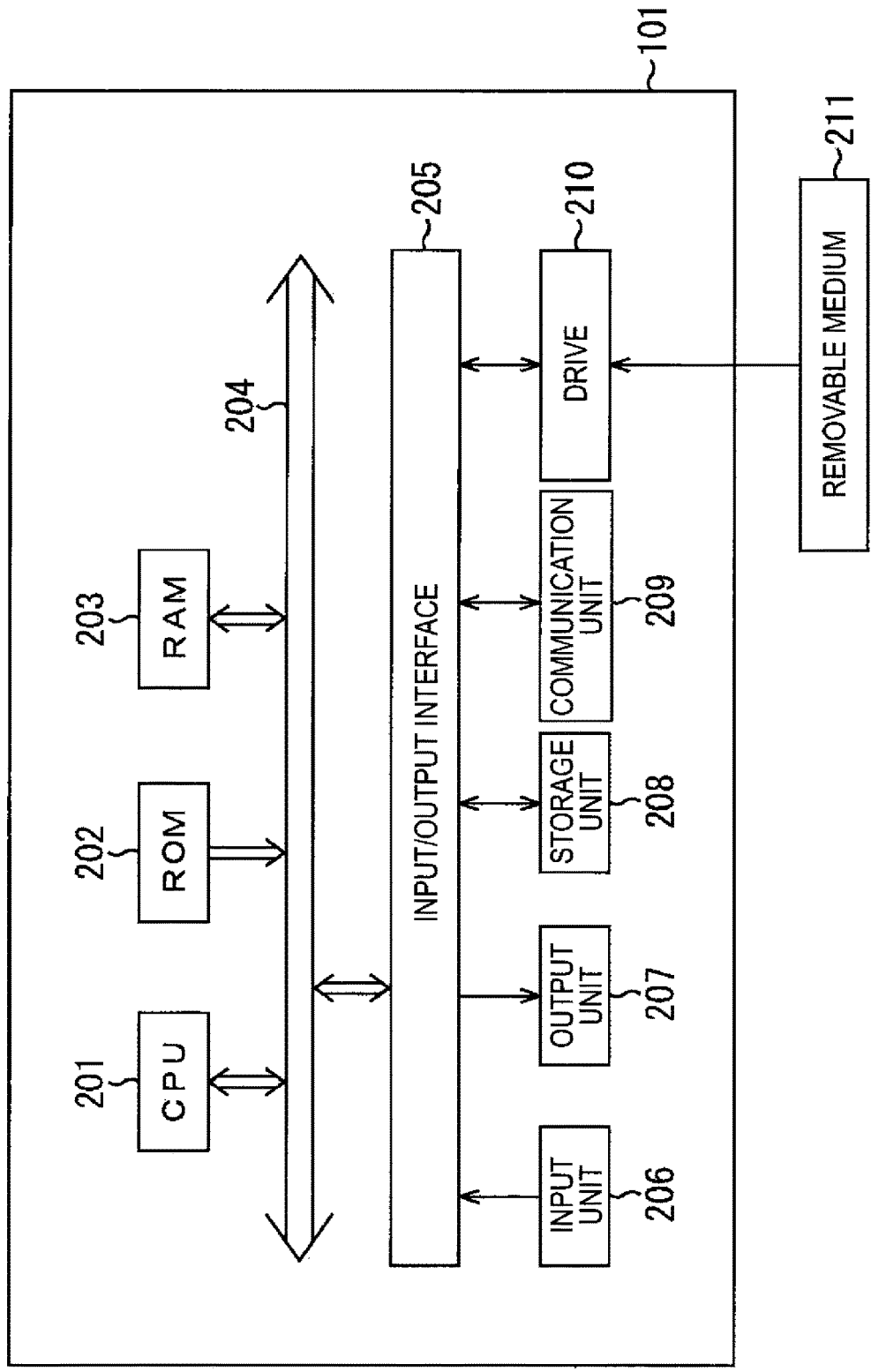

[Fig. 7]
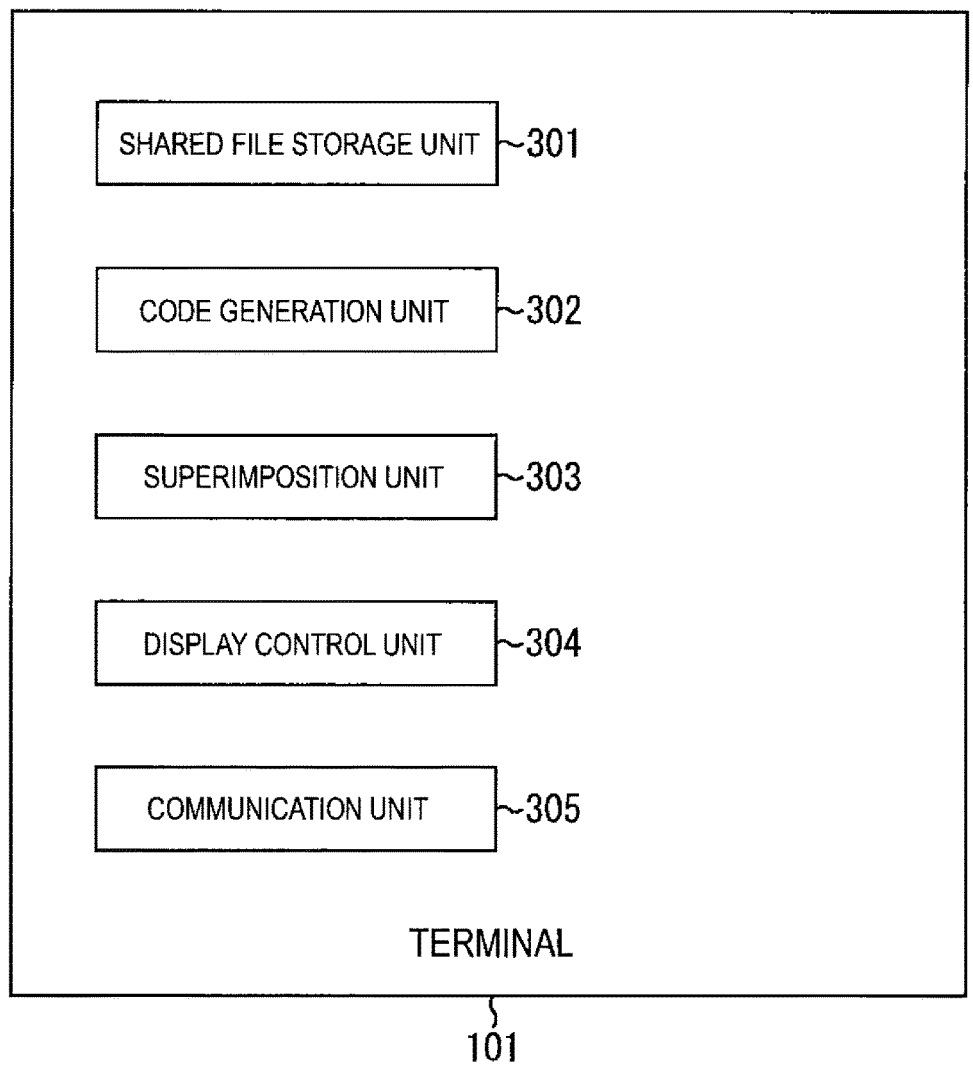

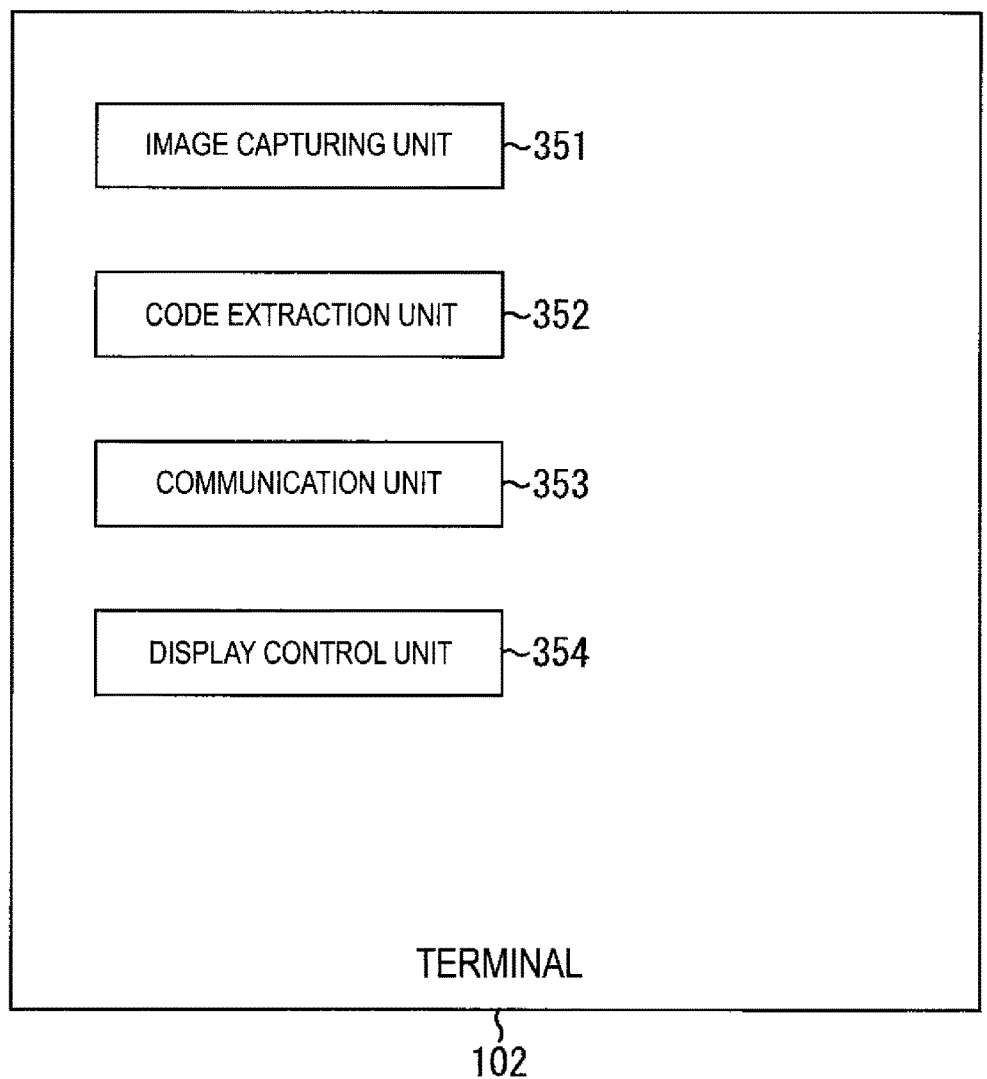

[Fig. 9]
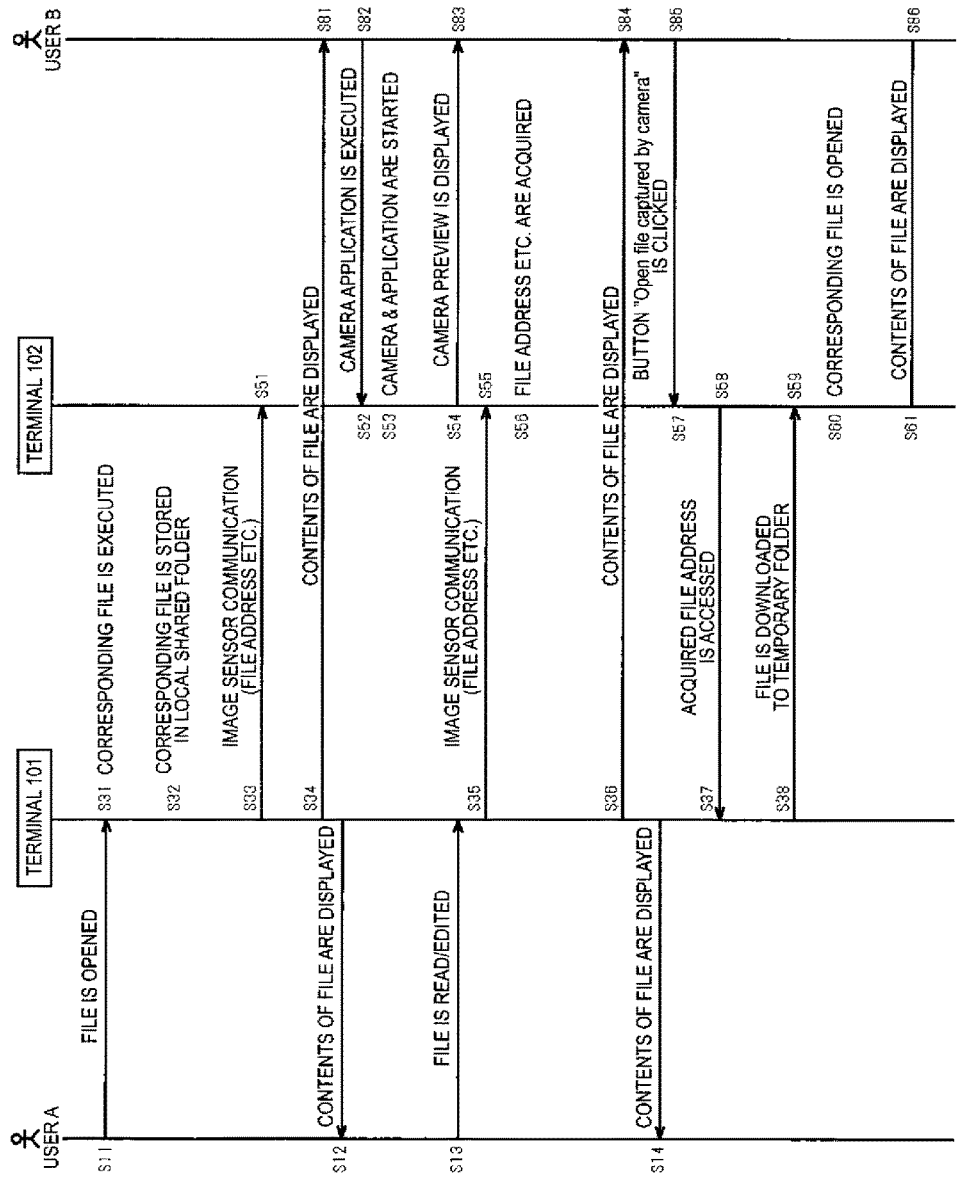

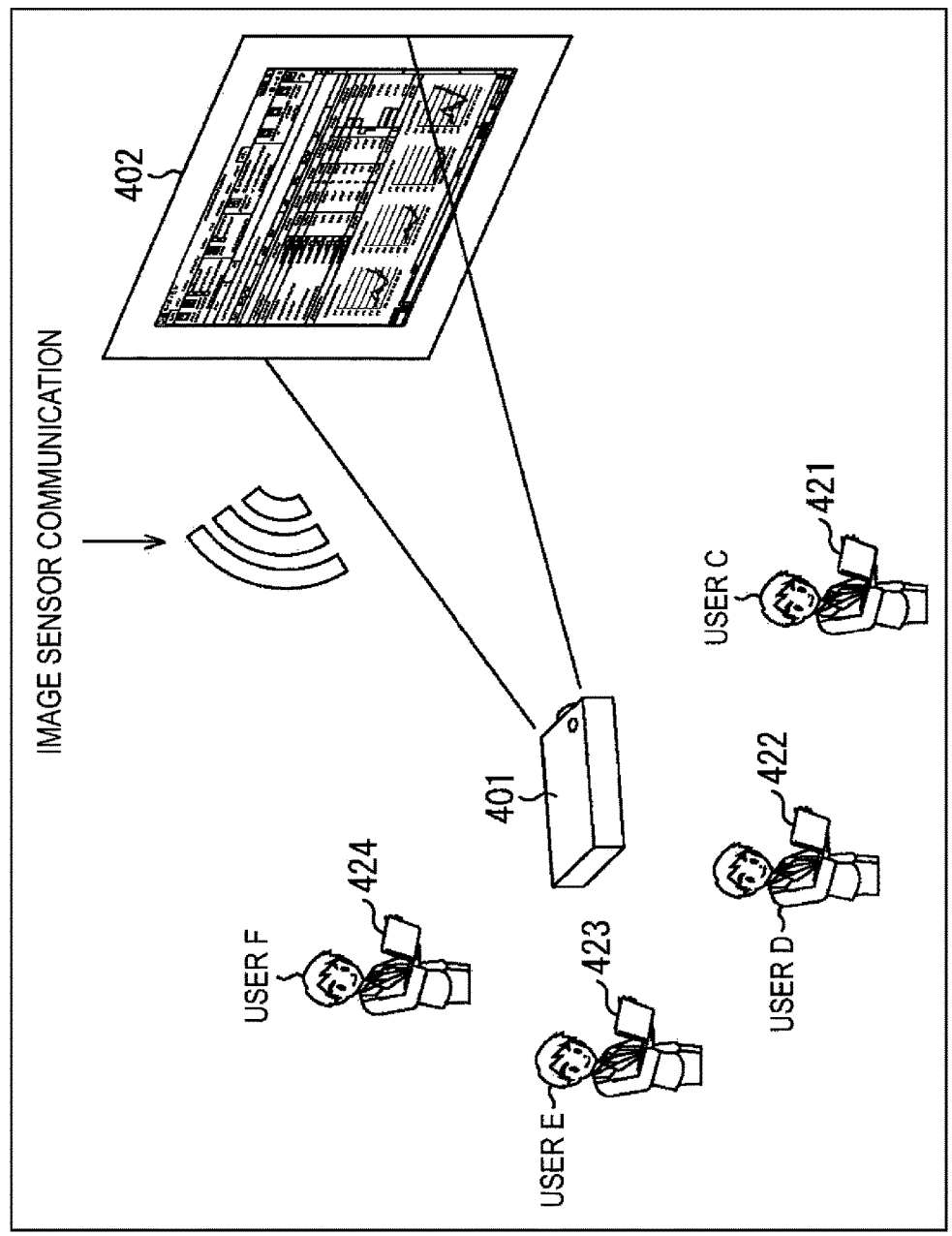
[Fig. 10]

[Fig. 11]
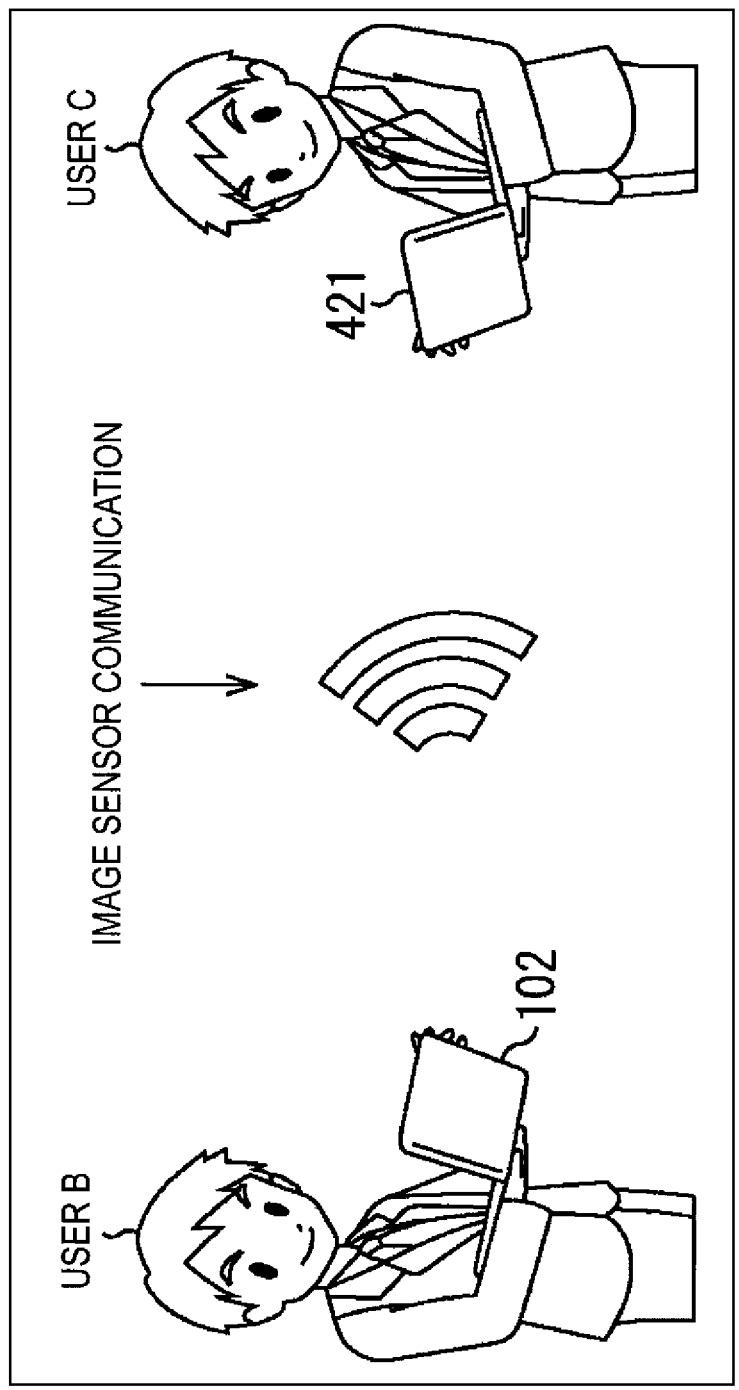

[Fig. 12]
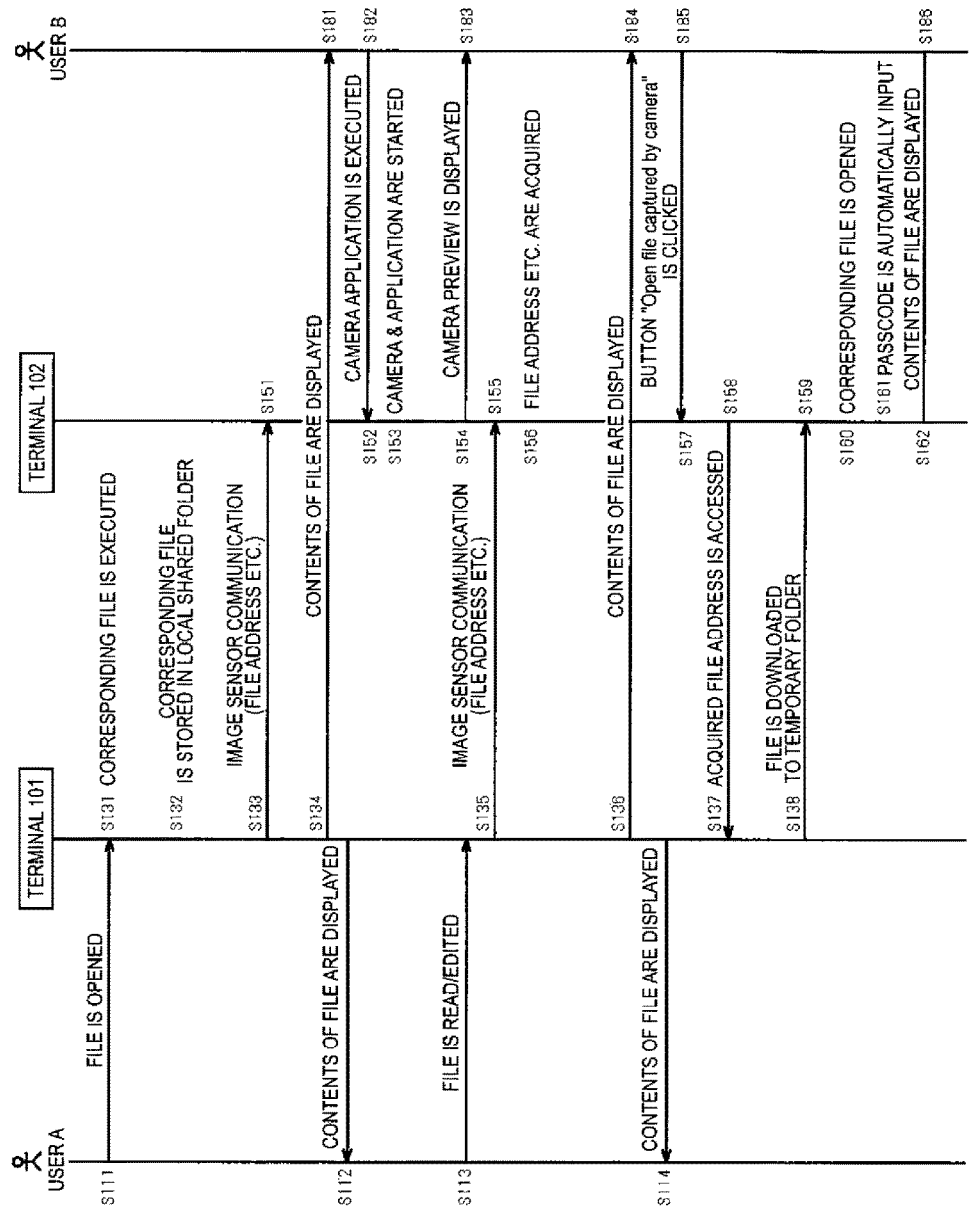

[Fig. 13]
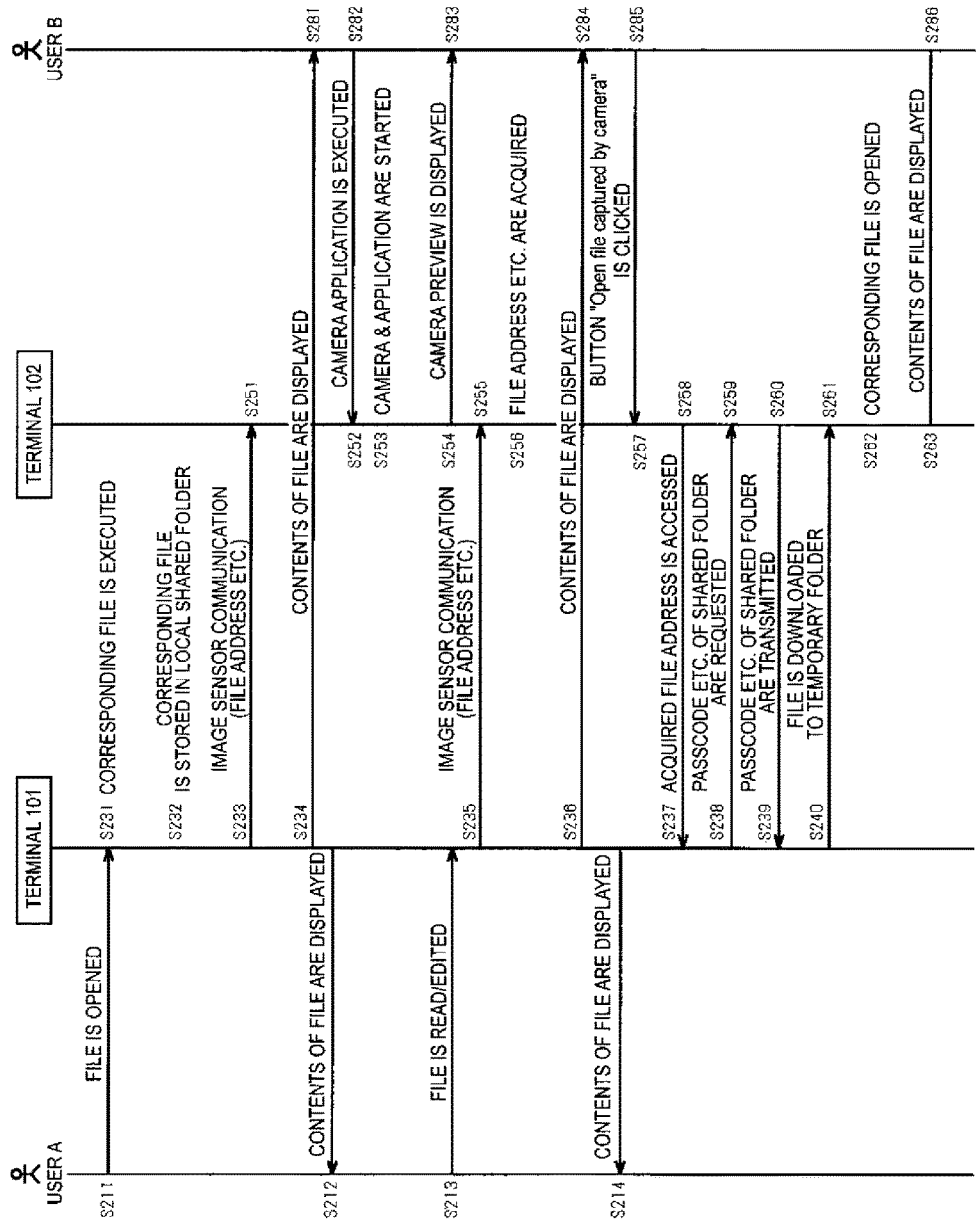

[Fig. 14]
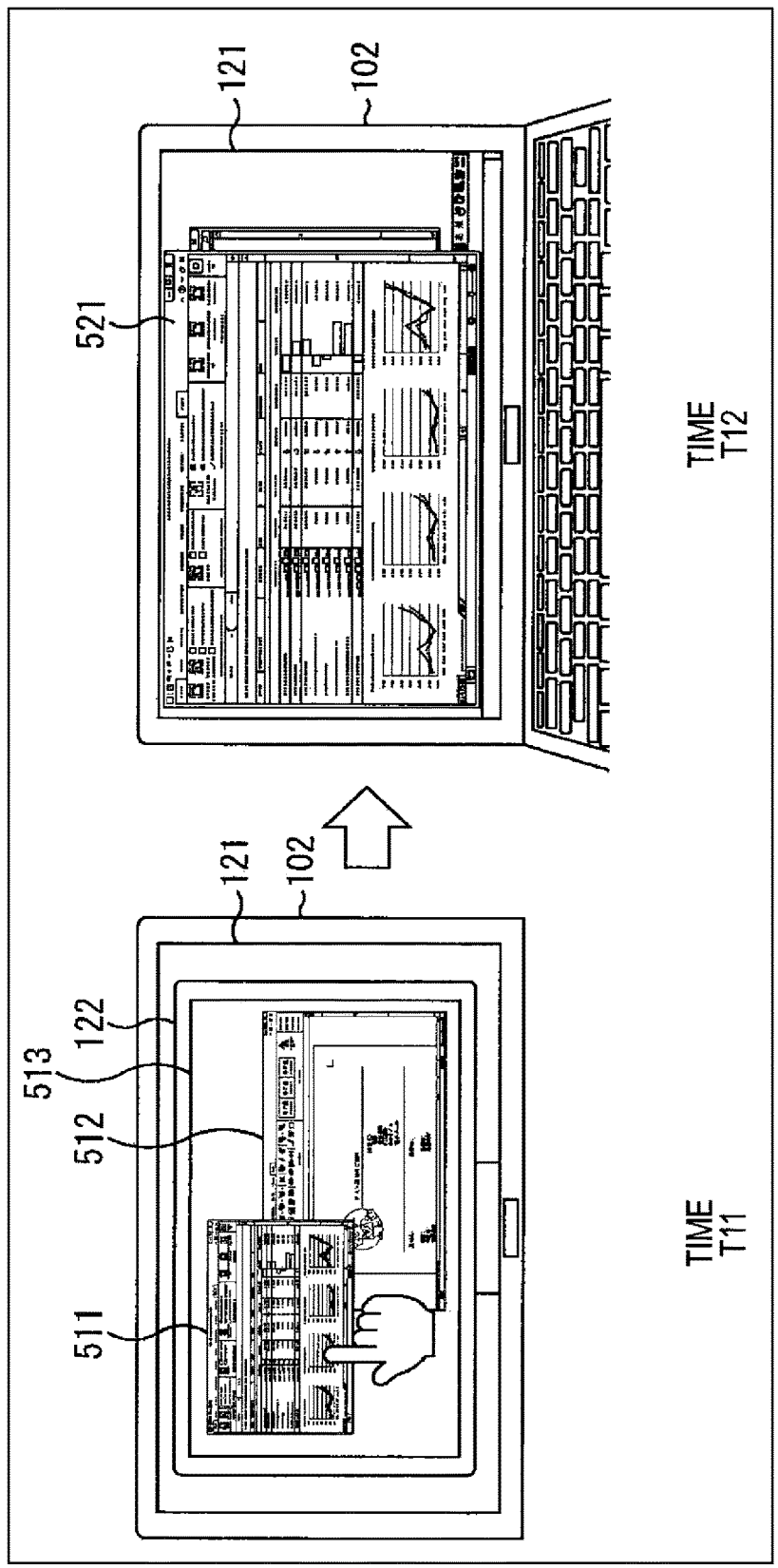

[Fig. 15]
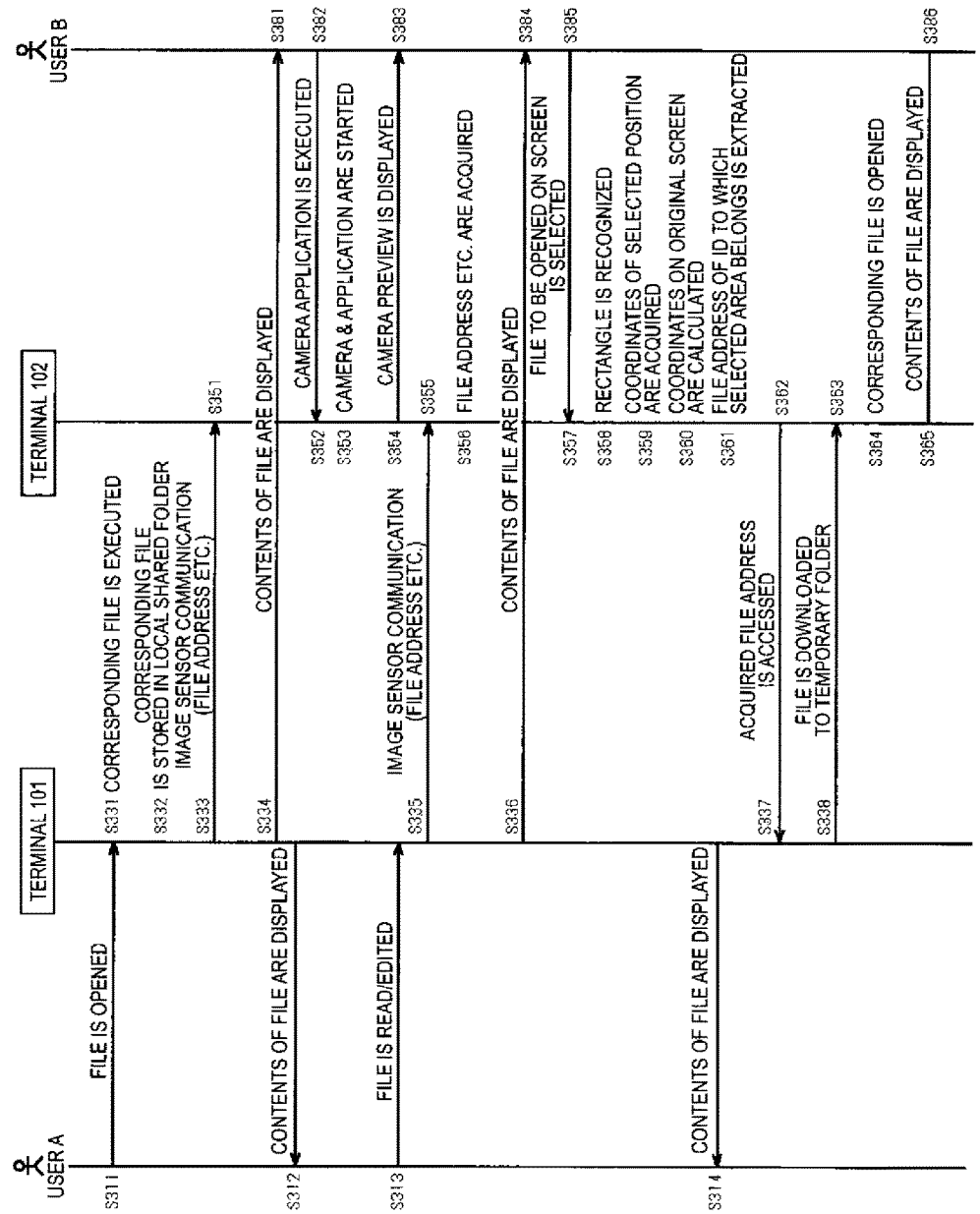

[Fig. 16]
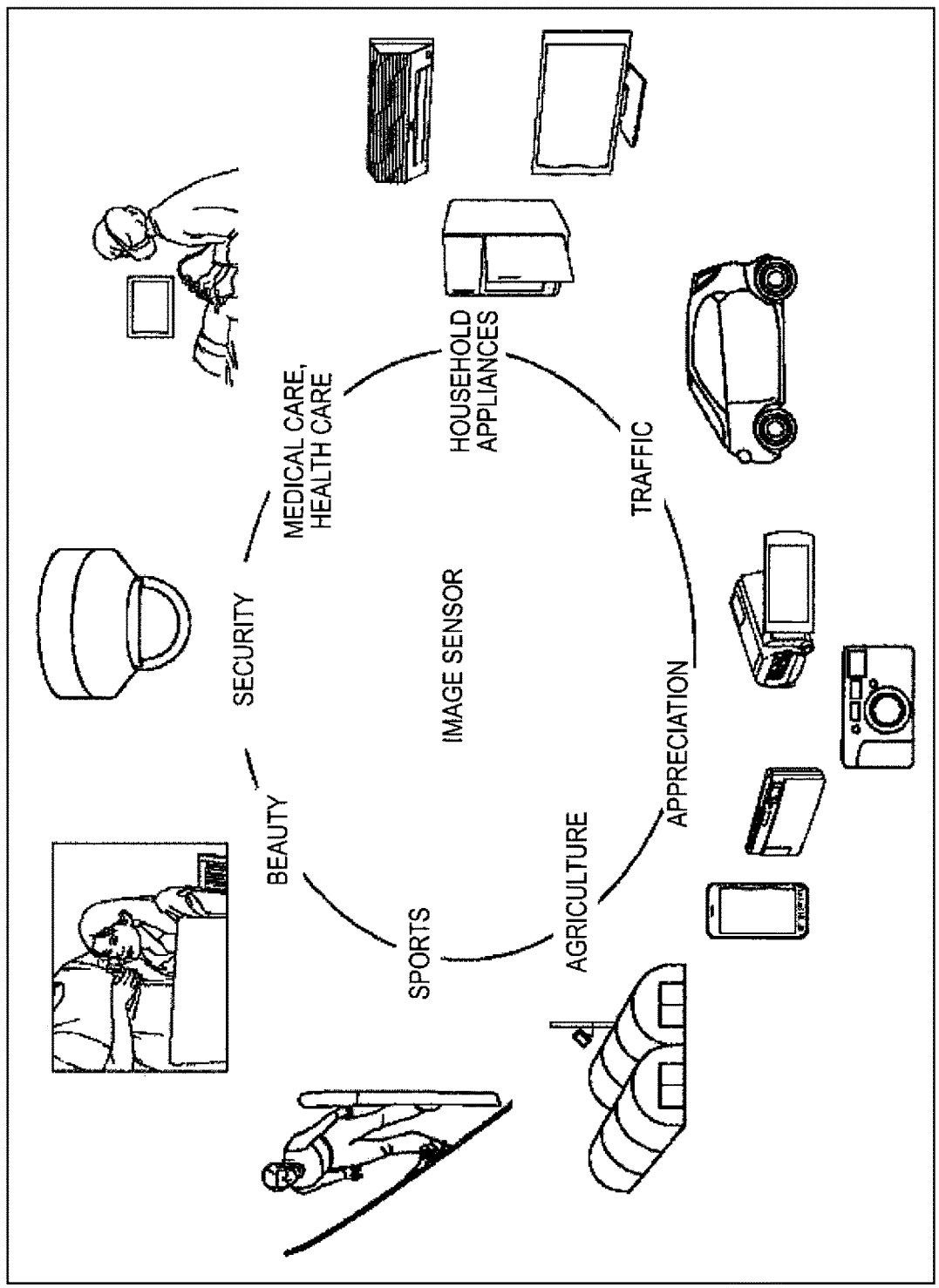

DEVICE, SYSTEM, AND METHOD FOR DISPLAYING AN IMAGE TOGETHER WITH A SUPERIMPOSED LIGHT COMPONENT REPRESENTING A CODE

TECHNICAL FIELD

The present technology relates to an information processing device, an information processing method, and a program. Specifically, the present technology relates to an information processing device, an information processing method, and a program, each of which performs communication with the use of an image sensor.

CROSS-REFERENCE TO RELATED APPLICATIONS

This application is a National Stage of International Application No. PCT/JP2016/000100, filed in the Japanese Patent Office as a Receiving office on Jan. 12, 2016, which claims priority to Japanese Patent Application Number 2015-011591, filed in the Japanese Patent Office on Jan. 23, 2015, each of which is hereby incorporated by reference in its entirety.

BACKGROUND ART

In the case where a plurality of users share a file with the use of terminals such as a personal computer and a smartphone, there is a method in which an address of a storage location of the file is exchanged via emails, instant messengers, or the like, thereby sharing the file.

As another method, an address of a storage location of a file is exchanged between terminals via communication such as infrared communication or Bluetooth (registered trademark), thereby sharing the file. PTL 1 proposes to transmit/receive file data via optical communication.

CITATION LIST

Patent Literature

PTL 1: JP 2007-074268A

SUMMARY OF INVENTION

Technical Problem

In the case where an email, an instant messenger, or the like is used, it is necessary to acquire information that is needed to perform communication, such as an address of the email or the instant messenger, in advance. In the case of communication using infrared rays, it is necessary to perform communication in a state in which devices are close to each other and are caused to correctly face each other so that infrared communication can be performed. In the case of communication using Bluetooth (registered trademark), it is necessary to perform pairing between terminals before address information of a file is exchanged.

In order to share a file, it is necessary to exchange information on an email address or perform setting for communication in advance as described above. Further, in order to execute processing for sharing a file, in some cases, a user on a transmission side needs to interrupt work that the user executes at that time.

According to the proposition by PTL 1, there is a possibility that a normal image and a code cannot be separated on a reception side and therefore information on a screen cannot be checked.

It is desirable to improve usability by easily transmitting/receiving data that is needed to share a file, such as address information of a file, without performing acquisition of information, setting, or the like in advance.

The present technology has been made in view of the circumstances and can easily transmit and/or receive information.

In some embodiments, an information processing device may comprise circuitry configured to cause an image to be displayed on a display together with a superimposed light component having a characteristic that changes as a function of time and represents a code to be processed by a receiving terminal.

In some embodiments, an information processing device may comprise circuitry configured to process image data from an image sensor, which image data represents an image generated on a display together with a superimposed light component having a characteristic that changes as a function of time, to identify a code represented by the superimposed light component.

In some embodiments, an information processing device may comprise a display and circuitry, wherein the circuitry is configured to cause an image to be displayed on the display together with a superimposed light component having a characteristic that changes as a function of time and represents a code to be processed by a receiving terminal.

In some embodiments, an information processing system may comprise first circuitry and second circuitry. The first circuitry may be configured to cause an image to be displayed on a display together with a superimposed light component having a characteristic that changes as a function of time and represents a code. The second circuitry may be configured to process image data from an image sensor, which image data represents the image generated on the display together with the superimposed light component, to identify the code represented by the superimposed light component.

Advantageous Effects of Invention

According to an embodiment of the present technology, it is possible to easily transmit/receive information.

Note that the effect described herein is not necessarily limited and may be any one of effects described in the present disclosure.

BRIEF DESCRIPTION OF DRAWINGS

FIG. 1 illustrates communication using an image sensor.
FIG. 2 illustrates communication using an image sensor.
FIG. 3 illustrates communication using an image sensor.
FIG. 4 illustrates sharing of a file.
FIG. 5 illustrates screen examples displayed on a terminal.
FIG. 6 shows a configuration of a terminal.
FIG. 7 shows a configuration of a terminal.
FIG. 8 shows a configuration of a terminal.
FIG. 9 is a timing chart showing processing for sharing a file in Embodiment 1.
FIG. 10 illustrates sharing of a file using a projector.
FIG. 11 illustrates sharing of a file between a plurality of users.

FIG. 12 is a timing chart showing processing for sharing a file in Embodiment 2.

FIG. 13 is a timing chart showing processing for sharing a file in Embodiment 3.

FIG. 14 illustrates sharing of a file in Embodiment 4.

FIG. 15 is a timing chart showing processing for sharing a file in Embodiment 4.

FIG. 16 illustrates another use example using the above image sensor communication.

DESCRIPTION OF EMBODIMENTS

Hereinafter, forms for implementing the present technology (hereinafter, referred to as embodiments) will be described. Note that description will be provided in the following order.

1. Communication using image sensor
2. Embodiment 1
3. Embodiment 2
4. Embodiment 3
5. Embodiment 4

<Communication Using Image Sensor>

In the following embodiments, information is transmitted/received via communication using an image sensor. In the following embodiments, for example, there will be described an example where, in the case where a file is shared between a plurality of users, information such as an address of a storage location of the file is transmitted/received.

Communication using an image sensor will be briefly described. FIG. 1 illustrates a mechanism for superimposing a code encoded in a terminal on a video and sending the code.

A screen of a terminal 10 that encodes a code and transmits the code has a function of encoding an inherent code into an optical signal and emitting light. In the terminal 10, the code is encoded as a chronological change of light intensity and is superimposed on a predetermined video (image) that is normally displayed on the screen of the terminal, and the code is then sent.

The screen of the terminal 10 is, for example, a liquid crystal display including backlight 11 and is configured so that an encoded code is input as a luminance modulation signal of the backlight 11 at the same time as a normal video signal is input to a liquid crystal pixel array 12.

A drawing on the right side of FIG. 1 illustrates a state in which a video (image) displayed on the display of the terminal 10 having the above configuration is captured by, for example, a pinhole camera 20. A video that can be captured by the pinhole camera 20 can be displayed as a cross-sectional view obtained when rays of light passing a pinhole 21 pass a virtual image capturing surface 22 positioned in front of the pinhole 21.

When the image capturing surface 22 is placed to face the display of the terminal 10 as illustrated in FIG. 1, it is possible to obtain a cross section that is similar to a light emitting surface of the display as a video. At this time, the backlight 11 simultaneously changes luminance of the whole light emitting surface, and therefore luminance of the captured video is simultaneously changed irrespective of a location. A time change thereof is in proportion to a change of the encoded code. For example, signals shown in a graph on the right side of FIG. 1 are taken out.

Luminance of light emitted from the display is changed with time as described above. However, because changing velocity thereof is set to be faster than speed of time response of human eyes, such change is integrated and is not recognizable by human beings. In some embodiments, for example, luminance of the light component may be caused to change as a function of time at a rate faster than 30 Hz.

In addition to the method using backlight described above, a method of superimposing a code on a video may be applied. For example, it is possible to process, in advance, a video that is simultaneously projected so that luminance thereof is changed in accordance with a luminance change of a code. In that case, backlight is operated at certain luminance.

In addition to the method of superimposing a code as a luminance change, a method of superimposing a code as a color change may be applied. For example, there is a liquid crystal display in which multicolor light emitting LEDs are used as the backlight 11, and, by modulating intensity balance of LEDs of respective kinds of color on the basis of amplitude of an encoded code with the use of the liquid crystal display, it is possible to superimpose a code as a color change of a video that emits light. Also in this method, because color changing velocity thereof is set to be faster than the speed of time response of human eyes, such change is integrated and is not recognizable by human beings, as in the case of the luminance change.

It is also possible to superimpose a code as a color change by a method of processing a video in advance.

A mechanism for capturing a video on which a code is superimposed with the use of a camera of a terminal on a reception side and separating the code will be described with reference to FIG. 2.

For example, as the terminal on the reception side, a personal computer or a mobile phone is a device in which a camera including an image sensor such as a CMOS image sensor is provided. A normal CMOS image sensor reads a signal measured with a pixel by rolling shutter operation.

The rolling shutter operation is a method in which reading control is performed while a timing is gradually shifted for each row as illustrated in FIG. 2A. Therefore, a period in which light of a pixel in a line in an upper part of a frame of a captured image is exposed (top drawing in FIG. 2B), a period in which light of a pixel in a line in a middle part of the same frame is exposed (middle drawing in FIG. 2B), and a period in which light of a pixel in a line in a lower part of the same frame is exposed (bottom drawing in FIG. 2B) are different from one another.

As a result, although luminance of a video emitted from the display of the terminal 10 (FIG. 1) is changed uniformly on the surface at the same timing, the luminance change of the video captured by the camera is observed as a lateral stripe pattern illustrated in FIG. 2E. Because those lateral stripes are generated by the rolling shutter operation of the image sensor, stripes are lateral stripes in a captured video irrespective of a relative positional relationship between the display and the camera. By using this characteristic, it is possible to separate an encoded code from the original video (FIG. 2E) projected on the display.

Further, a video on which an encoded code illustrated in FIG. 3E is superimposed on a video of an arbitrary background illustrated in FIG. 3D is captured by an image sensor in which a line to be projected to first exposure and a line to be projected to second exposure are close to each other as illustrated in FIG. 3A.

An image i_1 configured by pixels of the first exposure in FIG. 3B and an image i_2 configured by pixels of the second exposure in FIG. 3C are different in a period of exposure, and therefore time integration of a time change of a code is differently performed. As a result, lateral stripe patterns appearing in the images are different.

The following are mathematical expressions (I), where i_bg denotes an unknown background, s(t) denotes a shutter function (known) for each exposure time, and f(t) denotes a code to be obtained. Note that a signal is a signal after integration is performed for each line, and therefore an image has a function of only a position y in a vertical direction.

[Math. 1]

$$i_1(y) = (s_1(t)*f(t)) \cdot i_{bg}(y)$$

$$i_2(y) = (s_2(t)*f(t)) \cdot i_{bg}(y) \quad (1)$$

Herein, assuming that the first exposure is a multiple of a cycle of a luminance change of the code f(t) and such change is offset by performing integration with an exposure period, the following formula (2) is formed.

[Math. 2]

$$i_1(y) = k \cdot i_{bg}(y) \rightarrow i_2(y) = (s_2(t)*f(t)) \cdot \frac{i_1(y)}{k} \quad (2)$$

Because all parts of the formula (2) other than the variable f(t) are known, it is possible to obtain f(t). That is, in the case where the first exposure is synchronized with a modulation cycle of the code in advance, it is possible to separate the code from the arbitrary background image. In this way, a code (predetermined information) is transmitted/received via communication using an image sensor by superimposing the code on a video (image) on a transmission side and separating the code from the video on a reception side.

Embodiment 1

There will be described an embodiment in which information on an address where a file is stored is transmitted/received via the above communication using an image sensor (hereinafter, referred to as image sensor communication) to thereby share the file.

Operation performed by a user to share a file will be described with reference to FIG. 4. A user A opens and reads a predetermined file (hereinafter, referred to as a file A) in a terminal 101 at a time T1. A user B is near the user A, has a terminal 102, and is a user who is to share the file A. The terminal 102 includes an image sensor.

In the case where the user A sets the file A as a file that can be shared, a code containing information on an address where the file A is stored is generated, is encoded into an optical signal, and is superimposed on an image of the file A. The user B turns the image sensor (camera) of his/her terminal 102 toward the terminal 101 of the user A and captures an image at a time T2.

By capturing the image, for example, an image illustrated in FIG. 5A is displayed on the terminal 102 of the user B. FIG. 5A illustrates an example of a screen displayed on a display 121 of the terminal 102 of the user B at the time T2.

An image of the user A and a screen displayed on a display of the terminal 101 is displayed as an image 122 on the display 121 of the terminal 102. Further, a button 123 that displays a message indicating that "Open file captured by camera" is displayed on the display 121, and a cursor 124 is positioned in the vicinity of the button 123.

Note that a stripe pattern is displayed on both the display of the terminal 101 at the time T2 in FIG. 4 and the display of the terminal 101 in the image 122 displayed on the display 121 in FIG. 5A. However, this stripe pattern only indicates that the code is superimposed on the displayed image and is sent, and the stripe pattern is not recognized by the user A or the user B as described above.

Note that the wording "capture an image" is used herein, and the wording "capture an image" means capturing an image of a state referred to as, for example, so-called live view with the use of the camera of the terminal 102 and encompasses capturing an image including processing for storing an image obtained by such live view. In other words, the code may be extracted from an image of live view or may be extracted from a stored image.

Further, an image of the whole display of the terminal 101 may be captured, or an image of a part thereof may be captured. Although FIG. 5A illustrates the image 122 obtained by capturing an image of the user A and the terminal 101, it is only necessary to capture an image of the whole display of the terminal 101 or a part thereof.

In the case where the user operates the terminal 101, when the screen illustrated in FIG. 5A is displayed on the terminal 102 of the user B at the time T2, the screen on the display 121 of the terminal 102 is switched to a screen illustrated in FIG. 5B.

In the case where the button 123 is operated, the code superimposed on the captured image, i.e., the address of the file A in this case is read, and the file A is accessed on the basis of the address. As a result, a window 131 of the file A is displayed on the display 121 of the terminal 102. This file A is the same as the file A displayed on the terminal 101 of the user A. Thus, the user A and the user B share the file A.

Herein, description will be provided assuming that the terminal 101 and the terminal 102 are personal computers. FIG. 6 shows a configuration example of the terminal 101 or the terminal 102 which is constituted by a personal computer. Note that the terminal 101 and the terminal 102 basically have a similar configuration, and therefore the terminal 101 will be described herein as an example.

A central processing unit (CPU) 201, a read only memory (ROM) 202, and a random access memory (RAM) 203 are mutually connected via a bus 204 in the terminal 101. Further, an input/output interface 205 is connected to the bus 204. An input unit 206, an output unit 207, a storage unit 208, a communication unit 209, and a drive 210 are connected to the input/output interface 205.

The input unit 206 includes a keyboard, a mouse, a microphone, or the like. The output unit 207 includes a display, a speaker, or the like. The storage unit 208 includes a hard disk, a nonvolatile memory, or the like. The communication unit 209 includes a network interface or the like. The drive 210 drives a removable medium 211 such as a magnetic disk, an optical disk, a magneto-optical disk, or a semiconductor memory.

In the terminal 101 configured as described above, a series of processing described below is performed by causing the CPU 201 to load, for example, a program stored in the storage unit 208 to the RAM 203 via the input/output interface 205 and the bus 204 and execute the program.

For example, the program executed by the computer (CPU 201) can be recorded in the removable medium 211 serving as a packaged medium or the like and can be provided. Further, the program can be provided via a wired or wireless transmission medium such as a local area network, the Internet, or digital satellite broadcasting.

In the computer, the program can be installed in the storage unit 208 via the input/output interface 205 by inserting the removable medium 211 into the drive 210. Alternatively, the program can be received by the communication unit 209 via the wired or wireless transmission medium and can be installed in the storage unit 208. As another method, the program can be installed in the ROM 202 or the storage unit 208 in advance.

Note that the program executed by the terminal 101 or the terminal 102 may be a program in which processing is performed in time series in order described in the present specification or may be a program in which processing is performed in parallel or at a necessary timing, i.e., for example, when calling is performed.

FIG. 7 shows a function of the terminal 101. The terminal 101 includes a shared file storage unit 301, a code generation unit 302, a superimposition unit 303, a display control unit 304, and a communication unit 305. The shared file storage unit 301 stores a file to be shared between a plurality of users, i.e., the file A in the above example.

The code generation unit 302 generates, as a code, the address where the file A is stored, i.e., the address of the file A in the shared file storage unit 301 in this case. Note that, although description will be provided assuming that the address is included in the code herein, information other than the address, such as a passcode and an ID, can also be included in the code as described below. In some embodiments, the code may represent multiple addresses where respective files are stored.

In some embodiments, the code may additionally or alternatively represent a file itself, thus enabling the represented file to be communicated directly to the terminal 102 via the superimposed light component.

The superimposition unit 303 generates an image by superimposing the code generated by the code generation unit 302 on the image of the file A. The code is encoded into the above optical signal and is superimposed on the image. The display control unit 304 controls display of the image on which the code is superimposed by the superimposition unit 303 on the display. The communication unit 305 controls communication with the terminal 102 when the terminal 102 accesses the file A stored in the shared file storage unit 301.

FIG. 8 shows a function of the terminal 102. The terminal 102 includes an image capturing unit 351, a code extraction unit 352, a communication unit 353, and a display control unit 354. The image capturing unit 351 includes a camera including an image sensor and captures an image in a condition of an exposure time corresponding to a modulation cycle of a code sent by the terminal 101. The code extraction unit 352 extracts the code superimposed on the image captured by the image capturing unit 351.

The communication unit 353 accesses the terminal 101 on the basis of the code extracted by the code extraction unit 352, i.e., the address of the file A in this case, thereby acquiring data of the file A. The communication unit 353 communicates with the terminal 101 via a network such as a local area network (LAN) or communicates therewith via infrared rays or the like when the terminal is positioned in the vicinity of the communication unit 353. The display control unit 354 controls display of a screen based on the acquired data of the file A.

Note that, herein, description will be provided assuming that the terminal 101 superimposes a code on an image and transmits the code and the terminal 102 receives the superimposed code. However, the terminal 101 or 102 may be a terminal having a function of transmitting a code and a function of receiving a code, i.e., a terminal having both functions shown in FIG. 7 and FIG. 8.

Processing of the user A, the user B, the terminal 101, and the terminal 102 will be described with reference to a timing chart of FIG. 9. Further, a situation herein is a situation described above with reference to FIG. 4, and there will be described, as an example, a situation in which the file A displayed on the terminal 101 of the user A is shared with the user B.

In Step S11, the user A performs processing for opening the file A with the use of his/her terminal 101. In Step S31, the terminal 101 executes processing for opening the specified file A. In Step S32, the terminal 101 stores the opened file A in a shared folder. In this case, the file is stored in the shared file storage unit 301 (FIG. 7).

In the case where the file A is set to be a shared file in advance, the file A is copied or moved to the shared folder on the basis of such setting. Further, in the case where the file A is put into the shared folder or is set to be a shared file by the user A when the file A is opened, the file A is copied or moved to the shared folder.

The file A may be set to be a shared file by another method and may be managed by the shared file storage unit 301. A folder managed by the shared file storage unit 301 may be a folder in the terminal 101 or a predetermined folder in a network. Herein, description will be provided assuming that the shared file storage unit 301 manages a folder (local shared folder) in the terminal 101.

In Step S31, the terminal 101 opens the file A, and the file A may be stored in a predetermined folder in the terminal 101 or may be stored in a predetermined folder in a network. Alternatively, the file A may have already been stored in the shared folder before the file A is opened.

In the case where the file A is stored in the local shared folder in Step S32, a code including an address indicating a storage location of the file A is generated by the code generation unit 302 (FIG. 7) in Step S33 by using such storage of the file A as a trigger. Note that, herein, description will be provided assuming that the code is generated by using the storage of the file A in the local shared folder as a trigger. However, for example, the code may be generated by another processing, i.e., by using opening of the file A stored in the shared folder, specification of the file A as a shared file, or the like as a trigger.

In Step S33, the code is generated and the code is superimposed on an image of the file A, and image sensor communication is started. The superimposition unit 303 (FIG. 7) superimposes the code generated by the code generation unit 302 on the image of the file A, and the image on which the code is superimposed is displayed on the display under control of the display control unit 304, and thus image sensor communication is started.

The user A starts looking at the image of the file A displayed on the display of the terminal 101 in Step S12. Although the code is superimposed on the image looked at by the user A, such superimposition of the code is not recognizable by the user A as described above, and therefore the following situation does not occur: the image of the file A is not clearly visible to the user A due to the superimposed code.

Image sensor communication is started without causing the user A to recognize the start, that is, without bothering the user A as described above. Therefore, the user A can put the file A into a shareable state without performing processing for sharing the file A, and the user A can continue work without interrupting the work. That is, the user A reads the displayed file and, for example, edits the file as necessary in Step S13.

Meanwhile, the image of the file A displayed on the terminal 101 of the user A can also be visually recognized by the user B. The image of the file A displayed on the terminal 101 can be visually recognized by the user A in Step S34 and can also be visually recognized by the user B (Step S81).

In the case where the user B visually recognizes the image of the file A displayed on the terminal 101 and desires to share the file A, the user B executes processing for starting a camera application in Step S82. This camera application is an application that is started to receive information via image sensor communication.

In the case where an instruction to start the camera application is given by the user B, the terminal 102 executes processing for starting the camera and the camera application in Step S53. Then, in the case where the camera and the camera application are started, camera preview display (display also referred to as live view or the like) is started in Step S54.

In the case where the camera and the camera application are started, a screen such as that in FIG. 5A is displayed on the display 121 of the terminal 102. In the case where the camera application is started, for example, the button 123 indicating that "Open file captured by camera" is displayed. Further, in the case where the user B turns the camera of the terminal 102 toward the terminal 101, the screen of the terminal 101 is also displayed on the display 121 of the terminal 102 as illustrated in FIG. 5A.

In Step S55, the terminal 102 receives information such as a file address from the terminal 101 via image sensor communication. Although the terminal 101 starts image sensor communication from Step S33, the code is transmitted only until the camera and the camera application are started in the terminal 102. However, after the camera and the camera application are started in the terminal 102, the code transmitted by the terminal 101 is received.

In Step S56, the code extraction unit 352 of the terminal 102 extracts the code (address information) superimposed on the image captured by the image capturing unit 351. In this way, the user B can acquire the address of the storage location of the file A to be shared. While such image sensor communication is being performed, contents of the file are displayed on the display of the terminal 101 in Step S36 and the image is visually recognized by the user B (Step S84).

In the case where the user B looks at the image of the file opened by the user A, the image being displayed on his/her terminal 102, and desires to share the file A, for example, the button 123 indicating that "Open file captured by camera" displayed on the display 121 is operated (Step S85).

In Step S58, the terminal 102 that has accepted such operation from the user B in Step S57 accesses the storage location of the file A on the basis of the acquired address of the file A. In this case, the file A is stored in the shared folder of the terminal 101, and therefore accessing the shared folder of the terminal 101 is started.

In the case where the terminal 101 accepts access from the terminal 102 in Step S37, the terminal 101 allows the terminal 102 to start downloading the file A to a temporary folder in Step S38, and the terminal 102 starts downloading the file A to the temporary folder in Step S59.

In the case where the terminal 102 completes downloading of the file A to the temporary folder, the corresponding file is opened in Step S60. By opening the corresponding file, an image of the opened file A is displayed in Step S61, i.e., for example, the window 131 illustrated in FIG. 5B is opened on the display 121 of the terminal 102, and the contents of the file A can be read by the user B (Step S86).

In this way, the address of the storage location of the file A to be shared between the user A and the user B can be transmitted/received via image sensor communication. Further, by transmitting/receiving the address of the file A via image sensor communication, it is possible to exchange the address of the file A without exchanging, for example, an address of an email or an instant message in advance.

Further, the user B captures an image of the terminal 101 of the user A in a state in which the user B is near the user A, and therefore the user A can know that the user B captures the image and can recognize that the user B may share the file A. If the user A does not desire to share the file A with the user B, the user A tells the user B not to capture the image, thereby preventing capturing of the image.

In this way, only a user who is allowed to share the file A is allowed to transmit/receive the address via image sensor communication, and the file can be shared between users who are allowed to share the file. Therefore, it is possible to eliminate a user with whom the file is not to be shared and to prevent such user from improperly sharing the file.

Further, the present technology is applicable to a case where, for example, only users in a predetermined conference room are allowed to share a file. For example, as illustrated in FIG. 10, an image based on the file A is projected by a projector 401 on a screen 402, and the address of the storage location of the file A is coded and is superimposed on this image and is then projected. In this case, the code is transmitted from the screen 402 via image sensor communication.

A user C captures the image projected on the screen 402 with the use of a terminal 421. A user D captures the image projected on the screen 402 with the use of a terminal 422. A user E captures the image projected on the screen 402 with the use of a terminal 423. A user F captures the image projected on the screen 402 with the use of a terminal 424.

The image is captured by each user, and thus the users C to F can share the file with the use of their terminals 421 to 424. In the case where the users C to F are inside a predetermined conference room, it is difficult for a user outside the conference room to capture the image to share the file. This makes it possible to prevent a user outside the conference room from sharing the file.

Further, users who desire to share the file can share the file only by capturing an image with the use of their terminals. Such capturing of an image for sharing the file can be simultaneously performed by a plurality of users, and therefore it is possible to reduce a time it takes for performing processing to share the file.

As described above, a device that transmits a code only needs to have a function of projecting an image and is, for example, a personal computer and a projector, but the scope of the present technology is not limited to the personal computer, the projector, and the like. Further, as to a device that receives a code, the scope of the present technology is not limited to, for example, a personal computer having an image capturing function, and the device only needs to be a terminal having the image capturing function. For example, the present technology is also applicable to terminals such as a smartphone and a digital camera.

In the case where a plurality of users share a file, the plurality of users can capture an image of the same screen (image on screen 402) to thereby share the file as illustrated in FIG. 10. Alternatively, for example, there may be provided a mechanism in which a user who has shared a file allows another user to share the file.

For example, after the address of the file A is supplied to the user B from the user A via image sensor communication as described above with reference to FIG. 4 and FIG. 5, image sensor communication for supplying the address of the file A to the user C is performed between the user B and the user C as illustrated in FIG. 11.

When referring to FIG. 11, a state illustrated in FIG. 11 is a state in which the terminal 102 of the user B transmits a code via image sensor communication and the terminal 421 of the user C receives the code. Thus, the user A, the user B, and the user C can share the file A by sharing the file A between the user A and the user B and thereafter sharing the file between the user B and the user C.

Assuming that an address of the file A shared between the user A and the user B is an address A and an address of the file A shared between the user B and the user C is an address B, the address A and the address B may be the same address or may be different addresses.

For example, the address A is an address of the file A in the shared folder of the terminal 101 of the user A, and this address may be used as the address B, or the address B may be an address of the file A in a shared folder of the terminal 102 of the user B.

According to the processing described above with reference to FIG. 9, in the case where the file A is stored in the shared folder in Step S32, the address of the storage location of the file A is coded and image sensor communication is started in Step S33, and thereafter image sensor communication is continuously performed.

However, image sensor communication may be performed as necessary instead of continuously performing image sensor communication. For example, image sensor communication may be performed only for a predetermined time after image sensor communication is started, and image sensor communication may be stopped when the predetermined time has elapsed. Further, in the above case, a mechanism for resuming image sensor communication in response to an instruction from a user may be provided.

In the case where image sensor communication is constantly performed, for example, there is a possibility that a user who is not allowed to share the file captures an image of the terminal 101 while the user A is apart from the terminal 101 and uses the address of the file A by stealth.

For example, a sensor may be provided in the terminal 101, and image sensor communication may be performed in the case where the sensor determines that the user A is near the terminal 101, whereas image sensor communication may be stopped in the case where the sensor determines that the user A is not near the terminal 101. That is, there may be provided a mechanism for detecting absence of a user with the use of the sensor and controlling stop and resumption of image sensor communication on the basis of a detection result.

Alternatively, image sensor communication may be performed only while another user is near the user A. In the above example, in the case where the file is shared, the image is captured and the address of the file A is transmitted/received via image sensor communication while the user B is near the user A.

That is, in the case where the user B, who is to capture an image, is not near the user A, it is likely that a terminal (user) that receives a code transmitted via image sensor communication does not exist. Therefore, in the above situation, a mechanism for stopping image sensor communication may be provided.

Also in this case, a sensor may be provided to determine whether or not a user other than the user A is near the sensor and may perform control so that image sensor communication is performed in the case where a user is near the sensor, whereas image sensor communication is stopped in the case where a user is not near the sensor.

The sensor is, for example, a sensor that reacts to a body temperature of a user, such as a heat sensor, a sensor that analyzes an image captured by a camera to detect whether or not a user exists, or a sensor that determines an operation situation of a keyboard, a mouse, or the like and determines that no user exists when it is determined that operation has not been performed for a certain time.

Start, stop, or the like of image sensor communication can be appropriately changed as described above.

Note that, when the file A is shared with the user B, the terminal may have a function of notifying the user A of such sharing. For example, when the terminal 102 of the user B downloads the file A, the user A may be notified of such downloading.

By performing such notification, the user A can recognize sharing of the file A, and, if the file A is improperly shared, the user A can recognize such improper sharing and take some measure thereagainst.

Embodiment 2

Embodiment 2 will be described. In Embodiment 1, a case where the file A to be shared is stored in the shared folder has been described. Further, in the above description, the address of the storage location is coded and is transmitted/received via image sensor communication, and, in the case of transmission/reception thereof, the user A visually recognizes the user B to check whether or not the user is a user who is allowed to share the file, and therefore security is maintained.

There will be described an embodiment in which a passcode is set to a file to be shared in order to further improve security.

In the case where the file A is stored in the shared folder as in Embodiment 1, a user who is not allowed to share the file A may access the file A if the user knows the address of the shared folder.

In the case where a passcode is set to the file A and a user who is not allowed to share the file does not know the passcode, it is difficult for the user to open the file, and therefore it is possible to prevent the user from reading the file A even if the user accesses the file A in the shared folder.

There will be described, with reference to FIG. 12, transmission/reception of the address of the file A to be shared whose security is improved by setting a passcode to the file A as described above.

Processing of the user A, the user B, the terminal 101, and the terminal 102 will be described with reference to a timing chart of FIG. 12. Further, a situation herein is a situation described above with reference to FIG. 4, and there will be described, as an example, a situation in which the file A displayed on the terminal 101 of the user A is shared with the user B. In Embodiment 2, description of processing similar to processing in Embodiment 1 (processing described above with reference to FIG. 9) will be omitted as appropriate.

Processing in Steps S111 to S114 performed by the user A is similar to the processing in Steps S111 to S114 shown in FIG. 9, and processing such as opening, reading, and editing of the file A is performed as appropriate.

Processing in Step S131 to S138 performed by the terminal 101 of the user A is similar to the processing in Step S31 to S38 shown in FIG. 9, and processing such as opening the file A, coding the address of the storage location of the file A, and executing image sensor communication in response to an instruction from the user A, and allowing the data of the file A to be downloaded in response to access from the terminal 102 is performed as appropriate.

However, in Step S133, in the case where the address of the storage location of the file A is coded, not only the address but also the passcode set to the file A is coded. Further, the coded address and the coded passcode are transmitted via image sensor communication.

Because the terminal 102 receives the address and the passcode via image sensor communication, processing in Step S161 is added. Processing in Steps S151 to S160 and Step S162 performed by the terminal 102 is similar to the processing in Steps S51 to S61 shown in FIG. 9.

After the terminal 102 receives the address of the storage location of the file A and the passcode set to the file A via image sensor communication, the file A is opened in Step S160. The passcode set to the file A is needed to open the file A, and therefore the passcode that has already been received (extracted) is automatically input in Step S161. Note that the wording "automatically input" means that the passcode is input only by processing of the terminal 102 without bothering the user B.

In the case where the file A is opened by inputting the passcode obtained via image sensor communication as described above, the user B can read the file A in the terminal 102. Processing in Steps S181 to 186 performed by the user B is similar to the processing in Steps S81 to 86 shown in FIG. 9. That is, the user B can share and read the file A not only in the case where the passcode is not set to the file A but also in the case where the passcode is set to the file A.

In this way, it is possible to improve security by setting a passcode to a file to be shared. Even in the case where a passcode is set to a file, it is possible to easily share the file via image sensor communication and open the file.

Embodiment 3

In Embodiment 2, there has been described an embodiment in which security is improved by setting a passcode to a file so that, even if a user who is not allowed to share the file accesses the file, it is difficult for the user to open the file because of the passcode.

There will be described an embodiment in which a passcode is set to a shared folder storing a file to be shared in order to prevent a user who is not allowed to share the file from accessing the shared folder.

In the case where the file A to be shared is stored in the shared folder as in Embodiment 1, a user who is not allowed to share the file A may access the shared folder and access the file A if the user knows the address of the shared folder.

In the case where a passcode is set to the shared folder and a user who is not allowed to share the file does not know the passcode, it is difficult for the user to access the shared folder, and therefore it is possible to prevent the user from reading the file A even if the user accesses the shared folder.

There will be described, with reference to FIG. 13, transmission/reception of the address of the file A to be shared whose security is improved by setting a passcode to the shared folder storing the file A as described above.

Processing of the user A, the user B, the terminal 101, and the terminal 102 will be described with reference to a timing chart of FIG. 13. Further, a situation herein is a situation described above with reference to FIG. 4, and there will be described, as an example, a situation in which the file A displayed on the terminal 101 of the user A is shared with the user B. In Embodiment 3, description of processing similar to processing in Embodiment 1 (processing shown in FIG. 9) will be omitted as appropriate.

Processing in Steps S211 to S214 performed by the user A is similar to the processing in Steps S11 to S14 shown in FIG. 9, and processing such as opening, reading, and editing of the file A is performed as appropriate.

Processing in Step S231 to S237 performed by the terminal 101 of the user A is similar to the processing in Step S31 to S37 shown in FIG. 9, and processing such as opening the file A, coding the address of the storage location of the file A, and executing image sensor communication in response to an instruction from the user A, and allowing the data of the file A to be downloaded in response to access from the terminal 102 is performed as appropriate.

However, in Step S233, in the case where the address of the storage location of the file A is coded, not only the address but also a user ID and a passcode that are needed to access the shared folder are coded. Further, the coded address, the coded user ID, and the coded passcode are transmitted via image sensor communication.

In the case where the terminal 101 accepts access to the file A from the terminal 102 in Step S237, the terminal 101 requests the user ID and the passcode to access the shared folder from the terminal 102 in Step S238.

The terminal 102, which receives such request of the terminal 101 in Step S259, transmits the user ID and the passcode that have already been acquired via image sensor communication to the terminal 101 in Step S260.

Upon receipt of the user ID and the passcode from the terminal 102 in Step S239, the terminal 101 determines whether or not the terminal 102 has a proper right to access the shared folder on the basis of the user ID and the passcode, and, in the case where the terminal 101 determines that the terminal 102 has the proper right, the processing proceeds to Step S240. If the terminal 101 determines that the terminal 102 does not have the proper right, access from the terminal 102 is rejected, and the processing thereafter is not performed.

The terminal 101 allows the file A to be downloaded to the temporary folder of the terminal 102 in Step S240. The processing thereafter in both the terminal 101 and the terminal 102 is performed in the same way as the processing in Embodiment 1, and therefore description thereof will be omitted.

Because the terminal 102 receives the address, the user ID, and the passcode via image sensor communication, processing in Steps S259 and Step S260 is performed as described above as processing performed when the terminal accesses the shared folder. Processing in Steps S251 to S258 and Steps S261 to S263 performed by the terminal 102 is similar to the processing in Steps S51 to S61 shown in FIG. 9.

In the case where the passcode and the ID obtained via image sensor communication as described above are used to access the shared folder and the file A is opened, the user B can read the file A in the terminal 102. Processing in Steps S281 to 286 performed by the user B is similar to the processing in Steps S81 to 86 shown in FIG. 9. That is, the user B can share and read the file A not only in the case where the passcode is not set to the shared folder but also in the case where the passcode is set to the shared folder.

In this way, it is possible to improve security by setting a passcode to a shared folder. Even in the case where a passcode is set to a shared folder, it is possible to easily share a file via image sensor communication and open the file.

An example where a passcode is set to a file to be shared has been described in Embodiment 2, and an example where a passcode is set to a folder to be shared has been described in Embodiment 3. Security may be improved by applying Embodiment 2 and Embodiment 3, i.e., by setting a passcode to a file to be shared and setting a passcode to a folder to be shared.

Embodiment 4

Embodiment 4 will be described. An embodiment in which, in the case where a plurality of shareable files are opened, a file to be shared is selected and is shared will be described in Embodiment 4.

FIG. 14 illustrates screen examples of the terminal 102 of the user B to share the file A. The terminal 102 captures an image of the display of the terminal 101 at time T11. The image 122 obtained by capturing an image of a screen displayed on the display of the terminal 101 of the user A is displayed on the display 121 of the terminal 102.

A window 511 and a window 512 are displayed in the image 122. In this case, the window 511 is displayed by opening the file A and the window 512 is displayed by opening the file B in the terminal 101. An image of a screen on which different files are opened is captured as described above, and therefore the image 122 illustrated in FIG. 14 is displayed on the display 121 of the terminal 102.

In the case where a file that the user B of the terminal 102 desires to share is the file A, the window 511 displaying the file A is selected. In the case where the file A is selected by performing predetermined operation at the time T11, i.e., for example, in the case where the window 511 is touched by the user B, the file A is acquired from the terminal 101 and is opened in the terminal 102, and a window 521 regarding the file A is displayed on the display 121 at a time T12.

In the case where, when a plurality of files are displayed, a file to be shared is selected and the file is shared as described above, information on a positional relationship of the file is also transmitted together with information on an address of a storage location of the file via image sensor communication. For example, the following is an example of information transmitted via image sensor communication in the case where the window 511 and the window 512 (file A and file B) at the time T11 in FIG. 14 are displayed.

g_width=1600, g_height=900
ID:1, x:50, y:50, width:500, height:300, URL=xxx
ID:2, x:300, y:300, width:700, height:450, URL=yyy In the above information, information in the first line indicates resolution of the display of the terminal 101. That is, the resolution is 1600×900 in the above example.

Information in the second line is position information of the window 151. Information in the third line is position information of the window 152. The position information contains an ID for identifying a file, coordinates (x, y), the width, and the height of a start position of the file (window), and an address (URL) of a storage location of the file.

The coordinates (x, y) of the start position of the file (window) are, for example, coordinates of an upper left position of the window. The width and the height are the length in a horizontal direction and the length in a vertical direction, respectively, from the start position.

The information on the file A in the second line indicates that the ID of the file A is "1", the coordinates of the start position of the window 151 of the file A are "x:50, y:50", the width of the window 151 is "width:500", and the height thereof is "height:300", and the address of the storage location of the file A is "URL=xxx".

Similarly, the information on the file B in the third line indicates that the ID of the file B is "2", the coordinates of the start position of the window 152 of the file B are "x:300, y:300", the width of the window 152 is "width:700", and the height thereof is "height:450", and the address of the storage location of the file B is "URL=yyy".

Note that, herein, description will be described assuming that the position information is coded and is transmitted/received. However, not only the above position information but also any information can be used as long as the information can be used to determine which file is selected by a user in the case where a plurality of files are displayed.

Processing performed when such information is transmitted/received via image sensor communication will be described with reference to a timing chart of FIG. 15. A situation herein is a situation described above with reference to FIG. 4 and FIG. 14, and there will be described, as an example, a situation in which the file A and the file B are displayed on the terminal 101 of the user A and the file A is shared with the user B. In Embodiment 4, description of processing (processing shown in FIG. 9) similar to the processing in Embodiment 1 will be omitted as appropriate.

Processing in Steps S311 to S314 performed by the user A is similar to the processing in Steps S111 to S114 shown in FIG. 9, and processing such as opening, reading, and editing the file A is performed as appropriate.

Processing in Step S331 to S338 performed by the terminal 101 of the user A is similar to the processing in Step S31 to S38 shown in FIG. 9, and processing such as opening the file A, coding the address of the storage location of the file A, and executing image sensor communication in response to an instruction from the user A, and allowing the data of the file A to be downloaded in response to access from the terminal 102 is performed as appropriate.

However, in Step S333, in the case where the address of the storage location of the file A is coded, not only the address but also information on a plurality of files such as the above position information is coded. Further, the coded address and the like are transmitted via image sensor communication.

Note that, in the case where Embodiment 2 is also applied, a passcode set to the file is also coded and is transmitted together with the above information via image sensor communication. Meanwhile, in the case where Embodiment 3 is also applied, an ID and a passcode to access the shared folder are also coded and are transmitted together with the above information via image sensor communication.

In the case where both Embodiment 2 and Embodiment 3 are applied, a passcode set to the file and an ID and a passcode to access the shared folder are also coded and are transmitted together with the above information via image sensor communication.

Because the terminal 102 receives the above information via image sensor communication, processing in Steps S357 to S361 is added. Processing in Steps S351 to S356 and Steps S362 to S365 performed by the terminal 102 other than Steps S357 to S361 is similar to the processing in Steps S51 to S56 and Steps S58 to S61 shown in FIG. 9.

The user B looks at an image at the time T11 in FIG. 14 and selects the file A as a file that the user desires to share in Step S385. For example, the file A is selected by touching the window 511. In the case where the file to be shared on the screen is selected by the user B as described above, such selection is accepted by the terminal 102 in Step S357.

The terminal 102 recognizes a rectangle in Step S358. The recognized rectangle is, for example, a rectangle 513 on the screen at the time T11 in FIG. 14 and is a display region of the display of the terminal 101 obtained by capturing an image of the display. The following processing is executed assuming that the rectangle 513 is recognized and resolution of the rectangle 513 corresponds to resolution of the terminal 101 that performs transmission/reception via image sensor communication.

The terminal 102 acquires coordinates of a selected position in Step S359. In the situation at the time T11 in FIG.

14, coordinates of a position touched by a user's finger are acquired as the coordinates of the selected position.

The coordinates acquired herein are coordinates on the display 121 of the terminal 102. Such processing performed herein can be expressed by the following formula.

$$[x,y]=getPosCur(\ )$$

In Step S360, the terminal 102 calculates coordinates on an original screen. The coordinates on the original screen means coordinates on the display of the terminal 101 in this case, and processing for converting the coordinates of the position selected by the user B on the display 121 of the terminal 102 into the coordinates on the display of the terminal 101 is executed in Step S360. The processing performed herein can be expressed by the following formula.

$$[x',y']=getPosOur(x,y)$$

In Step S361, the terminal 102 extracts an ID of a window (file) including the selected coordinates and extracts a file address associated with the ID. Such processing performed herein can be expressed by the following formula.

$$[ID,URL]=getURL(x',y')$$

The terminal 102 determines which window the coordinates calculated in the processing in Step S360 are included in among the windows obtained from the information that has been obtained via image sensor communication, thereby specifying a file and specifying an ID of the file. Then, a URL associated with the ID is extracted from the information that has been obtained via image sensor communication.

Herein, the processing in Steps S359 to S361 will be described again by using specific numerical values as an example. In Step S359, coordinates selected by the user B in the terminal 102 are (x, y)=(100, 200). The coordinates are converted into coordinates in the terminal 101 of the user A in Step S360, and the coordinates are (x', y')=(150, 300).

In the case where the above information is transmitted/received via image sensor communication, information on the file A is ID:1, x:50, y:50, width:500, height:300, URL=xxx, and information on the file B is ID:2, x:300, y:300, width:700, height:450, URL=yyy.

Based on the information of the file A, it is found that a size of the window 511 (FIG. 14) of the file A is (x, y)=(50, 50) to (550, 350) and a size of the window 512 of the file B is (x, y)=(300, 300) to (1000, 750). Whether the coordinates (x', y')=(150, 300) calculated in Step S360 are included in the window 511 or the window 512 is determined.

The coordinates (x', y')=(150, 300) are included in the window 511 having the size of (x, y)=(50, 50) to (550, 350), and therefore an address (URL) of a file having an ID of "1" is acquired in Step S361.

In the case where the terminal 102 acquires the address of the file to be shared as described above, access to the acquired file address is started in Step S362. Processing thereafter is similar to the processing that has already been described above, and therefore description thereof will be omitted.

In this way, in the case where a plurality of files are opened, a desired file can be selectively shared. Even in the case where a file to be shared is selected from a plurality of files, it is possible to easily share the file via image sensor communication and open the file.

Note that, although an example where one file is selected from two files has been described herein, the present technology is also applicable to a case where a plurality of files are selected from a plurality of files.

Embodiment 4 is also applicable to a case where a single file is opened and the file is shared as in Embodiments 1 to 3. That is, position information of a file transmitted/received via image sensor communication contains information on the single file, and a user who desires to share the file can select and share the file.

Further, as described above, security can be improved by applying Embodiment 4 in combination with Embodiment 2 or Embodiment 3.

Thus, according to an embodiment of the present technology, it is possible to share (exchange) a file without notifying users of the users' contact information such as email addresses or performing processing such as pairing in advance.

A user who desires to cause a file to be shared with another user can cause the file to be shared without interrupting his/her work.

As described above, in the case where a file is shared, a user shows a screen on which the file is displayed to a user who is allowed to share the file (a user allows a user who is allowed to share the file to capture an image of the screen), and therefore, at that point, sharing of the file with the user can be approved. Thus, it is possible to share the file while maintaining security.

Note that a program executed by a computer may be a program in which processing is performed in time series in order described in the present specification or may be a program in which processing is performed in parallel or at a necessary timing, i.e., for example, when calling is performed.

Further, in the present specification, a system means the whole apparatus configured by a plurality of devices.

Note that an effect described in the present specification is merely an example and is not limited, and another effect may be exerted.

Note that embodiments of the present technology are not limited to the above embodiments, and various kinds of modification can be performed within the scope of the present technology.

FIG. 16 illustrates another use example using the above image sensor communication.

The above image sensor communication can be used for, for example, the following various cases by sensing light such as visible light, infrared light, ultraviolet light, or X-rays.

A system in which, for example, an image captured with the use of a device that captures an image for appreciation, such as a digital camera or a portable device having a camera function, or data acquired by performing some image processing with respect to the captured image is shared with an electronic device such as a smartphone or a tablet via image sensor communication.

A system in which, for example, an image captured with the use of an image capturing device mounted inside/outside a vehicle or data acquired by performing some image processing with respect to the captured image is shared with an electronic device such as a smartphone or a tablet via image sensor communication.

A system in which, for example, an image for beauty use captured with the use of a skin measurement device that captures an image of skin, a microscope that captures an image of scalp, or the like or data acquired by performing some image processing with respect to the captured image is shared with an electronic device such as a smartphone or a tablet via image sensor communication. The image such an example would thus be an image of at least a portion of a human subject.

A system in which, for example, an image for medical use captured with the use of an image capturing device such as an endoscope, a gastrocamera, or the like or data acquired by performing some image processing with respect to the captured image is shared with an electronic device such as a smartphone or a tablet via image sensor communication. The image such an example would thus be an image generated by a medical imaging apparatus.

Note that data shared via the above image sensor communication is not limited to the above data.

Additionally, the present technology may also be configured as below.

(1)

An information processing device including:

circuitry configured to cause an image to be displayed on a display together with a superimposed light component having a characteristic that changes as a function of time and represents a code to be processed by a receiving terminal.

(2)

The information processing device according to (1), wherein the circuitry may be configured to cause the characteristic of the light component to change as a function of time at a rate faster than a reaction time of human eyes.

(3)

The information processing device according to (1), wherein the circuitry may be configured to cause the characteristic of the light component to change as a function of time at a rate faster than 30 Hz.

(4)

The information processing device according to (1), wherein the information processing device may further comprise the display.

(5)

The information processing device according to (1), wherein the characteristic of the light component may comprise a luminance level.

(6)

The information processing device according to (1), wherein the characteristic of the light component may comprise a color.

(7)

The information processing device according to (1), wherein the code may represent an address of a file.

(8)

The information processing device according to (7), wherein the superimposed light component may further represents a passcode of the file.

(9)

The information processing device according to (7) or (8), wherein the file may comprise an image of at least a portion of a human subject.

(10)

The information processing device according to any of (7) to (9), wherein the file may comprise an image generated by a medical imaging apparatus.

(11)

The information processing device according to (1), wherein the code may represent addresses of multiple files.

(12)

The information processing device according to (1), wherein the code may represent a file.

(13)

The information processing device according to (1), wherein the circuitry may comprise a central processing unit.

(14)

An information processing device including:

circuitry configured to process image data from an image sensor, which image data represents an image generated on a display together with a superimposed light component having a characteristic that changes as a function of time, to identify a code represented by the superimposed light component.

(15)

The information processing device according to (14), wherein the circuitry may be configured to process the image data image to identify the code represented by the superimposed light component when the characteristic of the superimposed light component changes as a function of time at a rate faster than a reaction time of human eyes.

(16)

The information processing device according to (14), wherein the circuitry may be configured to process the image data image to identify the code represented by the superimposed light component when the characteristic of the superimposed light component changes as a function of time at a rate faster than 30 Hz.

(17)

The information processing device according to (14), wherein the information processing device may further comprising the image sensor.

(18)

The information processing device according to (14), wherein the characteristic of the light component may comprise a luminance level.

(19)

The information processing device according to (14), wherein the characteristic of the light component may comprise a color.

(20)

The information processing device according to (14), wherein the code may represent an address of a file.

(21)

The information processing device according to (18), wherein the superimposed light component may further represent a passcode of the file.

(22)

The information processing device according to (18) or (19), wherein the circuitry may be further configured to automatically input the passcode of the file.

(23)

The information processing device according to (18), wherein the file may comprise an image of at least a portion of a human subject.

(24)

The information processing device according to (18), wherein the file may comprise an image generated by a medical imaging apparatus.

(25)

The information processing device according to (14), wherein the code may represent addresses of multiple files.

(26)

The information processing device according to (14), wherein the circuitry may comprise a central processing unit.

(27)

An information processing device including:

display and circuitry,
wherein the circuitry is configured to cause an image to be displayed on the display together with a superimposed light component having a characteristic that changes as a function of time and represents a code to be processed by a receiving terminal.

(28)
An information processing system including:
first circuitry configured to cause an image to be displayed on a display together with a superimposed light component having a characteristic that changes as a function of time and represents a code, and
second circuitry configured to process image data from an image sensor, which image data represents the image generated on the display together with the superimposed light component, to identify the code represented by the superimposed light component.

(29)
An information processing device including:
a coding unit configured to code an address of a storage location of a file to be shared;
a superimposition unit configured to superimpose the address coded by the coding unit on an image of the file; and
a display control unit configured to control display of the image on which the code is superimposed by the superimposition unit.

(30)
The information processing device according to (29),
wherein the file is a file managed in a shared folder, and
wherein the coding unit generates the code in a case where the file is copied or moved to the shared folder.

(31)
The information processing device according to (29) or (30),
wherein the coding unit also codes a passcode that is needed to open the file.

(32)
The information processing device according to (30) or (31),
wherein the coding unit also codes an ID and a passcode that are needed to access the shared folder.

(33)
The information processing device according to (32),
wherein, in a case where another terminal accesses the shared folder, the information processing device requests the ID and the passcode from the another terminal.

(34)
The information processing device according to any of (29) to (33),
wherein the coding unit also codes position information indicating a position where the file is displayed on a screen.

(35)
The information processing device according to (34),
wherein the position information is generated for each file displayed on the screen and is coded.

(36)
An information processing device including:
an image capturing unit configured to capture a predetermined image; and
a code extraction unit configured to extract a code superimposed on the image captured by the image capturing unit,
wherein the image captured by the image capturing unit is an image obtained by coding an address where a file to be shared is stored and superimposing the address on an image of the file.

(37)
The information processing device according to (36),
wherein the information processing device accesses the file on the basis of the address indicated by the code extracted by the code extraction unit.

(38)
The information processing device according to (36) or (37),
wherein the code further includes a passcode that is needed to open the file, and
wherein the file is opened with use of the passcode.

(39)
The information processing device according to any of (36) to (38),
wherein the code further includes an ID and a passcode that are needed to access a shared folder storing the file, and
wherein, in response to a request of a terminal that manages the shared folder, the information processing device transmits the ID and the passcode to the terminal.

(40)
The information processing device according to any of (36) to (39),
wherein the code further includes position information indicating a display position in another device that displays the image of the file,
wherein the information processing device specifies, with use of the position information, the file displayed in a position selected by a user in the image captured by the image capturing unit, and
wherein the information processing device accesses the specified file on the basis of the address included in the code.

(41)
An information processing method including:
coding an address of a storage location of a file to be shared;
superimposing the coded address on an image of the file; and
controlling display of the image on which the code is superimposed.

(42)
An information processing method including:
capturing a predetermined image; and
extracting a code superimposed on the captured image,
wherein the captured image is an image obtained by coding an address where a file to be shared is stored and superimposing the address on an image of the file.

(43)
A computer-readable program for executing processing including coding an address of a storage location of a file to be shared,
superimposing the coded address on an image of the file, and
controlling display of the image on which the code is superimposed.

(44)
A computer-readable program for executing processing including capturing a predetermined image, and
extracting a code superimposed on the captured image,
wherein the captured image is an image obtained by coding an address where a file to be shared is stored and superimposing the address on an image of the file.

REFERENCE SIGNS LIST

101 terminal
102 terminal
301 shared file storage unit
302 code generation unit
303 superimposition unit 304 display control unit
305 communication unit
351 image capturing unit
352 code extraction unit
353 communication unit
354 display control unit

The invention claimed is:

1. An information processing device, comprising:
a display device; and
processing circuitry including a processing device and a memory device storing instructions that, when executed by the processing device, are configured to:
generate an image to be displayed on the display device;
generate a light component that represents a code to be processed by a receiving terminal; and
control the display device to display the image together with the light component superimposed on the image, wherein the superimposed light component has a characteristic that simultaneously changes, as a function of time, on a whole light emitting surface of the display device.

2. The information processing device of claim 1, wherein the processing circuitry is configured to cause the characteristic of the light component to change as a function of time at a rate faster than a reaction time of human eyes.

3. The information processing device of claim 1, wherein the processing circuitry is configured to cause the characteristic of the light component to change as a function of time at a rate faster than 30 Hz.

4. The information processing device of claim 1, wherein the code represents a file.

5. The information processing device of claim 1, wherein the characteristic of the light component comprises a luminance level.

6. The information processing device of claim 1, wherein the characteristic of the light component comprises a color.

7. The information processing device of claim 1, wherein the code represents an address of a file.

8. The information processing device of claim 7, wherein the superimposed light component further represents a passcode of the file.

9. The information processing device of claim 7, wherein the file comprises an image of at least a portion of a human subject.

10. The information processing device of claim 7, wherein the file comprises an image generated by a medical imaging apparatus.

11. The information processing device of claim 1, wherein the code represents addresses of multiple files.

12. An information processing device, comprising:
an image sensor; and
processing circuitry including a processing device and a memory device storing instructions that, when executed by the processing device, are configured to:
receive image data from the image sensor, wherein a video corresponding to the image data is sensed by the image sensor on a display device and wherein the image data represents an image together with a superimposed light component;
extract from the image data a code represented by the superimposed light component; and
control a display on a screen based on the code extracted from the superimposed light component, wherein the superimposed light component has a characteristic that simultaneously changes, as a function of time, on a whole light emitting surface of the display device.

13. The information processing device of claim 12, wherein
the characteristic of the superimposed light component changes as a function of time at a rate faster than a reaction time of human eyes.

14. The information processing device of claim 12, wherein the characteristic of the superimposed light component changes as a function of time at a rate faster than 30 Hz.

15. The information processing device of claim 12, wherein the characteristic of the light component comprises a luminance level.

16. The information processing device of claim 12, wherein the characteristic of the light component comprises a color.

17. The information processing device of claim 12, wherein the code represents an address of a file.

18. The information processing device of claim 17, wherein the superimposed light component further represents a passcode of the file.

19. The information processing device of claim 18, wherein the processing circuitry is further configured to automatically input the passcode of the file.

20. The information processing device of claim 17, wherein the file comprises an image of at least a portion of a human subject.

21. The information processing device of claim 17, wherein the file comprises an image generated by a medical imaging apparatus.

22. The information processing device of claim 12, wherein the code represents addresses of multiple files.

23. An information processing system, comprising:
a display device;
first processing circuitry including a processing device and a memory device storing instructions that, when executed by the processing device, are configured to:
generate an image to be displayed on the display device;
generate a light component that represents a code to be processed by a receiving terminal; and
control the display device to display the image together with the light component superimposed on the image, wherein the superimposed light component has a characteristic that simultaneously changes, as a function of time, on a whole light emitting surface of the display device;
an image sensor; and
second processing circuitry including a processing device and a memory device storing instructions that, when executed by the processing device, are configured to:
receive image data from the image sensor, wherein a video corresponding to the image data is sensed by the image sensor on the display device and wherein the image data represents the image sensed by the image sensor on the display device together with the superimposed light component;
extract from the image data the code represented by the superimposed light component; and
control a display on a screen based on the code extracted from the superimposed light component.

* * * * *